US 8,695,775 B2

(12) United States Patent
Inomori et al.

(10) Patent No.: US 8,695,775 B2
(45) Date of Patent: *Apr. 15, 2014

(54) CENTRIFUGAL CLUTCH AND VEHICLE PROVIDED WITH THE SAME

(75) Inventors: Toshinori Inomori, Shizuoka (JP); Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1183 days.

This patent is subject to a terminal disclaimer.

(21) Appl. No.: 12/142,740

(22) Filed: Jun. 19, 2008

(65) Prior Publication Data

US 2009/0000895 A1    Jan. 1, 2009

(30) Foreign Application Priority Data

Jun. 29, 2007  (JP) .................................. 2007-171779
Sep. 27, 2007  (JP) .................................. 2007-250602

(51) Int. Cl.
*F16D 43/284*     (2006.01)

(52) U.S. Cl.
USPC ...................... 192/105 B; 192/83; 192/103 A

(58) Field of Classification Search
USPC .................... 192/83, 105 B, 103 A
See application file for complete search history.

(56) References Cited

U.S. PATENT DOCUMENTS

| | | | |
|---|---|---|---|
| 3,259,383 A * | 7/1966 | Johnson et al. ............... | 267/161 |
| 4,645,049 A * | 2/1987 | Matsuda et al. ............... | 192/35 |
| 5,261,517 A * | 11/1993 | Hering ...................... | 192/85.37 |
| 7,014,026 B2 * | 3/2006 | Drussel et al. ............ | 192/105 B |
| 8,210,333 B2 * | 7/2012 | Inomori et al. ............ | 192/105 B |
| 2005/0133336 A1 | 6/2005 | AbuSamra et al. | |
| 2005/0199468 A1 * | 9/2005 | Gochenour et al. ...... | 192/105 B |
| 2009/0000898 A1 * | 1/2009 | Inomori et al. ............ | 192/70.11 |

FOREIGN PATENT DOCUMENTS

| | | |
|---|---|---|
| EP | 1 772 642 A | 4/2007 |
| JP | 60 030832 A | 2/1985 |

(Continued)

OTHER PUBLICATIONS

European Search Report dated Apr. 22, 2009 for European Patent Application No. EP 08 01 1740.

(Continued)

*Primary Examiner* — David D Le
*Assistant Examiner* — Ryan Dodd
(74) *Attorney, Agent, or Firm* — Keating & Bennett, LLP

(57) ABSTRACT

A centrifugal clutch is provided with a clutch housing, a clutch boss, a plate group, a pressure plate, a roller retainer, a disc spring, a pressing body and a clutch release mechanism. The pressure plate is displaced on one side in the direction of an axis line and configured to directly or indirectly press the plate group and transition the same into a pressed-contact state. The disc spring extends in a direction of being inclined to the direction of the axis line from a first end portion toward a second end portion in a centrifugal direction. The first end portion of the disc spring is directly or indirectly fixed to the clutch housing. The second end portion of the disc spring directly or indirectly biases the roller retainer toward the plate group.

21 Claims, 19 Drawing Sheets

(56) References Cited

FOREIGN PATENT DOCUMENTS

| | | |
|---|---|---|
| JP | 61 103019 A | 5/1986 |
| JP | 04-316724 | 11/1992 |
| JP | 2005-207515 | 8/2005 |
| WO | WO 2005 083284 A | 9/2005 |
| WO | WO 2005 124178 A | 12/2005 |

OTHER PUBLICATIONS

European Search Report dated Apr. 28, 2009 for European Patent Application No. EP 08 01 1742.

U.S. Appl. No. 12/142,716, filed Jun. 19, 2008, entitled: "Clutch and Vehicle Having Clutch," inventors: Toshinori Inomori et al., assgnee: Yamaha Hatsudoki Kabushiki Kaisha.

* cited by examiner

US 8,695,775 B2

CENTRIFUGAL CLUTCH AND VEHICLE PROVIDED WITH THE SAME

PRIORITY INFORMATION

This patent application is based on and claims priority under 35 U.S.C. §119 to Japanese Patent Application No. 2007-171779, filed on Jun. 29, 2007 and Japanese Patent Application No. 2007-250602, filed on Sep. 27, 2007, the entire contents of which are hereby expressly incorporated by reference.

TECHNICAL FIELD

The present invention relates to a centrifugal clutch and a vehicle provided with a centrifugal clutch.

BACKGROUND ART

Japanese Patent Publication No. 04-316724 of Nov. 9, 1992 to Nakagaki Seiji et al. ("Seiji Publication") discloses a centrifugal clutch provided with a clutch release mechanism. FIG. 19 is a cross-sectional view of a centrifugal clutch 200 disclosed in Japanese Patent Publication No. 04-316724. As shown in FIG. 19, the centrifugal clutch 200 is provided with a clutch drum 201, a clutch hub 202 and a plate group 205. The plate group 205 is constituted by a drive plate 204 rotated with the clutch drum 201 and a driven plate 203 rotated with the clutch hub 202. In the centrifugal clutch 200, the distance between a pressurizing plate 210 and a traveling plate 207 is extended by a centrifugal force which acts on a centrifugal ball 208 and a biasing force of clutch spring 206. On the other hand, the distance between the pressurizing plate 210 and the bottom portion of the clutch drum 201 is narrowed. Consequently, the plate group 205 transitions into a pressed contact state.

Clutch spring 206 comprises a compression coil spring in the Seiji Publication. Therefore, it is necessary to separately arrange an end plate 209 receiving the biasing force of the clutch spring 206 so as to face the traveling plate 207. The end plate 209 and the traveling plate 207 must have relatively high rigidity so as not to be transformed at the time of receiving the biasing force of the clutch spring 206. In other words, it is necessary to provide an end plate 209 and the traveling plate 207, which have relatively high rigidity and thickness when using the clutch spring 206 as constituted by the compression coil spring. Therefore, there arises a problem that the clutch is large-sized.

The present invention has been devised in light of the above-described circumstances, and it is an object thereof to compactify a centrifugal clutch which is provided with a clutch release mechanism.

SUMMARY

A clutch according to the present invention comprises a clutch housing, a clutch boss, a plate group, a pressure member, a retainer, a plate spring, a pressing body and a clutch release mechanism. The clutch housing is rotated around an axis line. The clutch boss is arranged inside the clutch housing. The clutch boss is also rotated around the axis line. The plate group has a friction plate and a clutch plate. The friction plate is rotated with the clutch housing. The clutch plate faces the friction plate so as to be displaceable in the direction of the axis line. The clutch plate is rotated with the clutch boss. The pressure member is arranged further on one side than the plate group. The pressure member is rotated with the clutch housing. The pressure member can be displaced in the direction of the axis line. The pressure member is displaced to the other side in the direction of the axis line to directly or indirectly press the plate group so as to put the plate group in a pressed-contact state.

The retainer faces a surface on one side of the pressure member. The retainer is rotated with the clutch housing. The retainer is supported directly or indirectly by the clutch housing so as to be displaceable in the direction of the axis line. The retainer forms a space which is narrower as it is far from the axis line relative to the pressure member.

The plate spring is provided between the clutch housing and the retainer further on one side than the retainer. The plate spring extends in a direction of being inclined relative to the direction of the axis line from one terminal portion toward another terminal portion in the centrifugal direction. One terminal portion of the plate spring is directly or indirectly fixed to the clutch housing. As for the plate spring, the other terminal portion of the plate spring directly or indirectly biases the retainer to the other side.

The pressing body is arranged in the space between the pressure member and the retainer. The pressing body is revolved around the axis line in consonance with the rotation of the clutch housing. The pressing body is moved in a direction away from the axis line while pressing the pressure member to the side of the plate group by a centrifugal force generated by the revolution. The clutch release mechanism presses the pressure member to one side, and releases the pressed contact state of the plate group.

DETAILED DESCRIPTION

Embodiments of the present invention can compactify a centrifugal clutch provided with a clutch release mechanism and/or stabilize the clutch release point.

A. Embodiment 1

Figure 1:
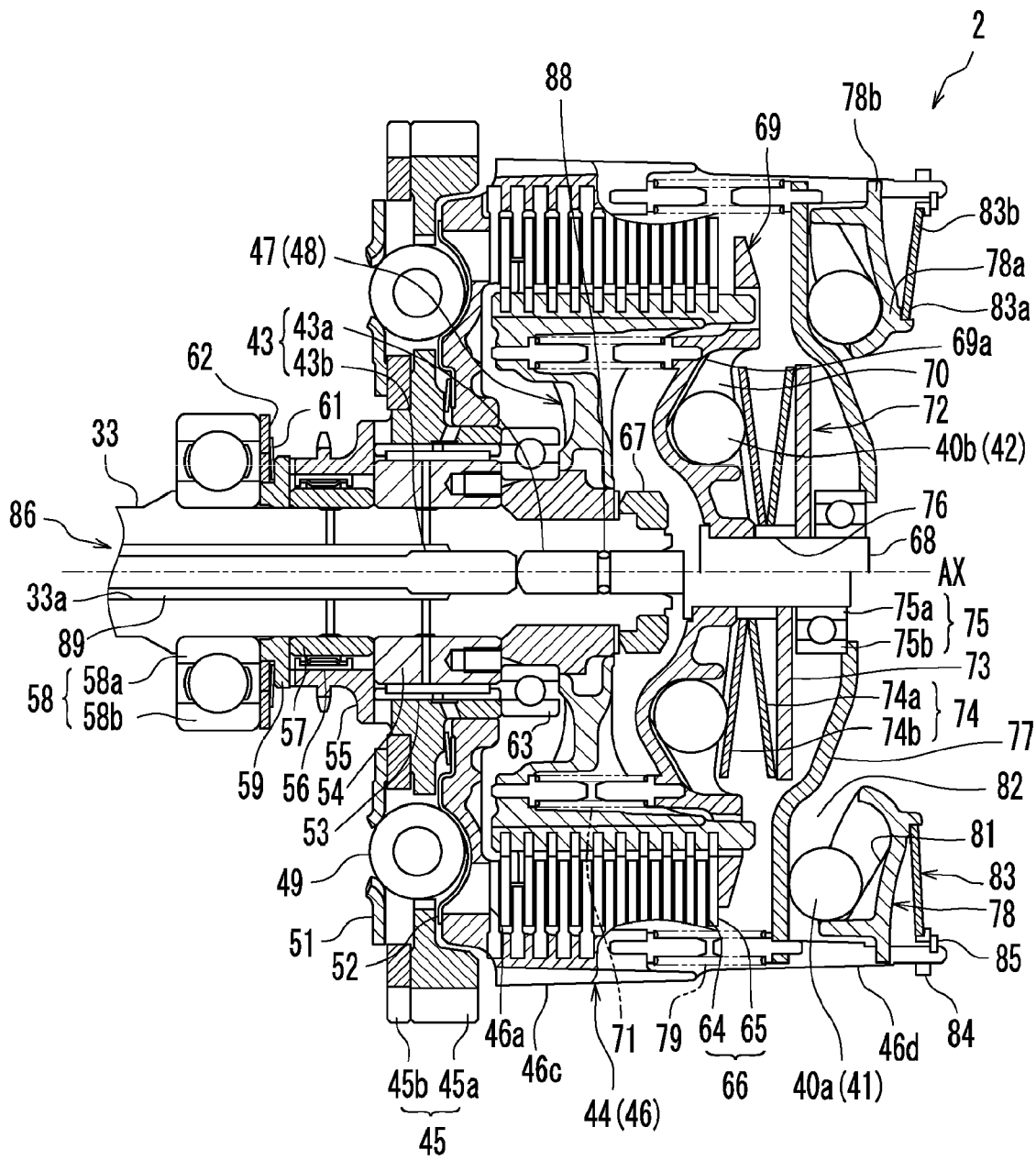
FIG. 1 is a sectional view of a clutch according to the present invention.

In this embodiment, as shown in FIG. 1, a disc spring 83, which is a kind of a plate spring, may be used as a biasing means for directly or indirectly biasing a plate group 66. Disc spring 83 is arranged on the same side as an input side pressing body 40a with respect to the plate group 66 to attain the compactness of a centrifugal clutch 2.

Hereinafter, a clutch constructed in accordance with an embodiment of the present invention, and a vehicle provided with the same will be described, in reference to a centrifugal clutch 2 shown in FIG. 1 and a motorcycle 1 shown in FIG. 3 as examples. Motorcycle 1 and centrifugal clutch 2 are merely exemplary embodiments in accordance with the general principles of the present invention. The embodiments of the present invention are not limited to the motorcycle 1 and the centrifugal clutch 2. A vehicle for use according to the present invention may be, for example, a straddle-type vehicle such as an off-road type motorcycle, a scooter, a moped or ATV (All Terrain Vehicle). Alternatively, the vehicle according to the present invention may be a vehicle other than a straddle-type vehicle, as represented, for example, by a four-wheel vehicle or the like. Herein, in this specification, the term "motorcycle" does not refer only to a motorcycle in the narrow sense, but rather is intended to broadly include off-road vehicles, scooters and mopeds or the like.

Figure 3:
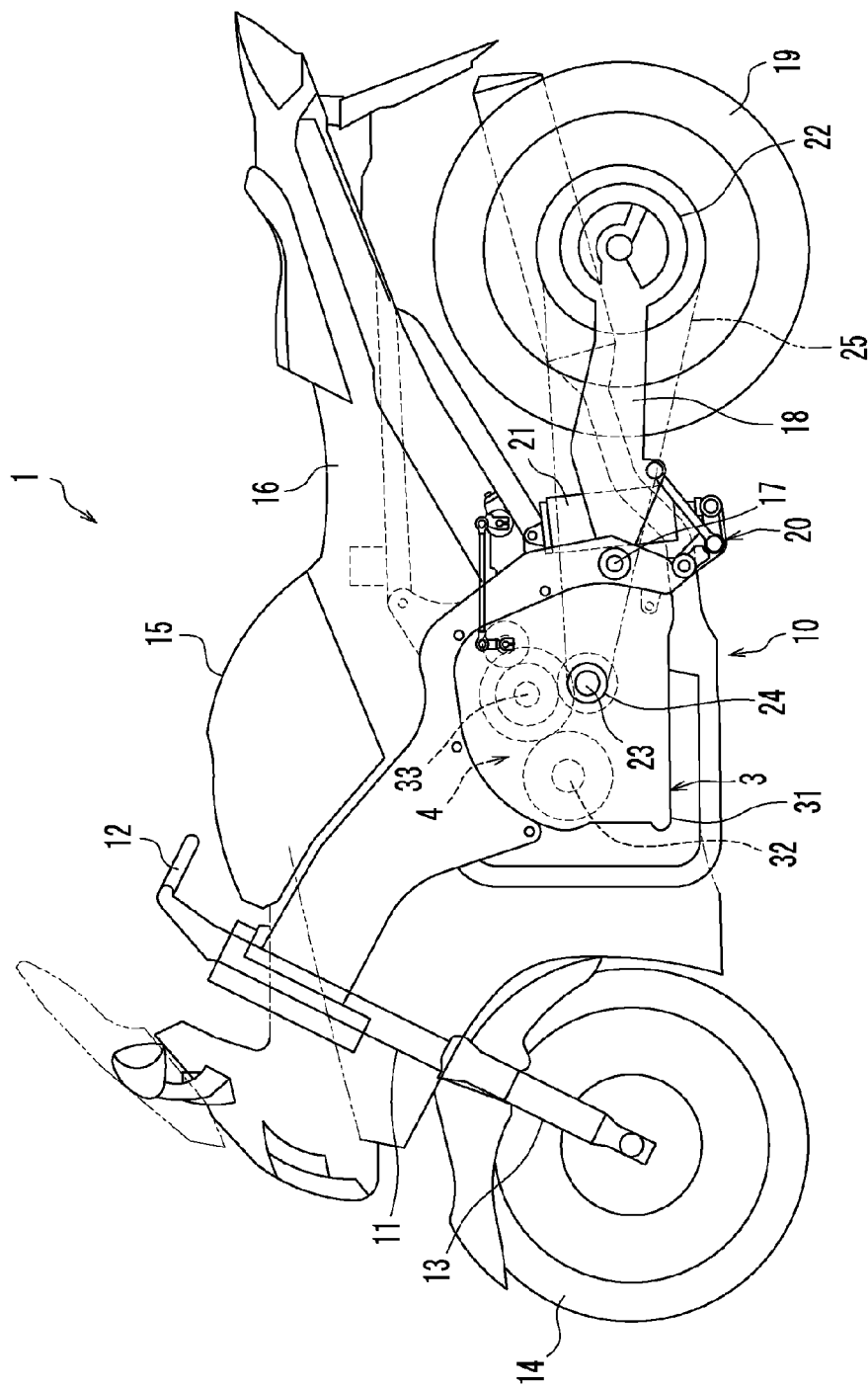
FIG. 3 is a left side view of a motorcycle using the power unit shown in FIG. 2.

In the following description, the terms "front," "back," "left" and "right" generally refer to directions of a crew member occupying a motorcycle seat 16, as shown in FIG. 3.

Figure 2:
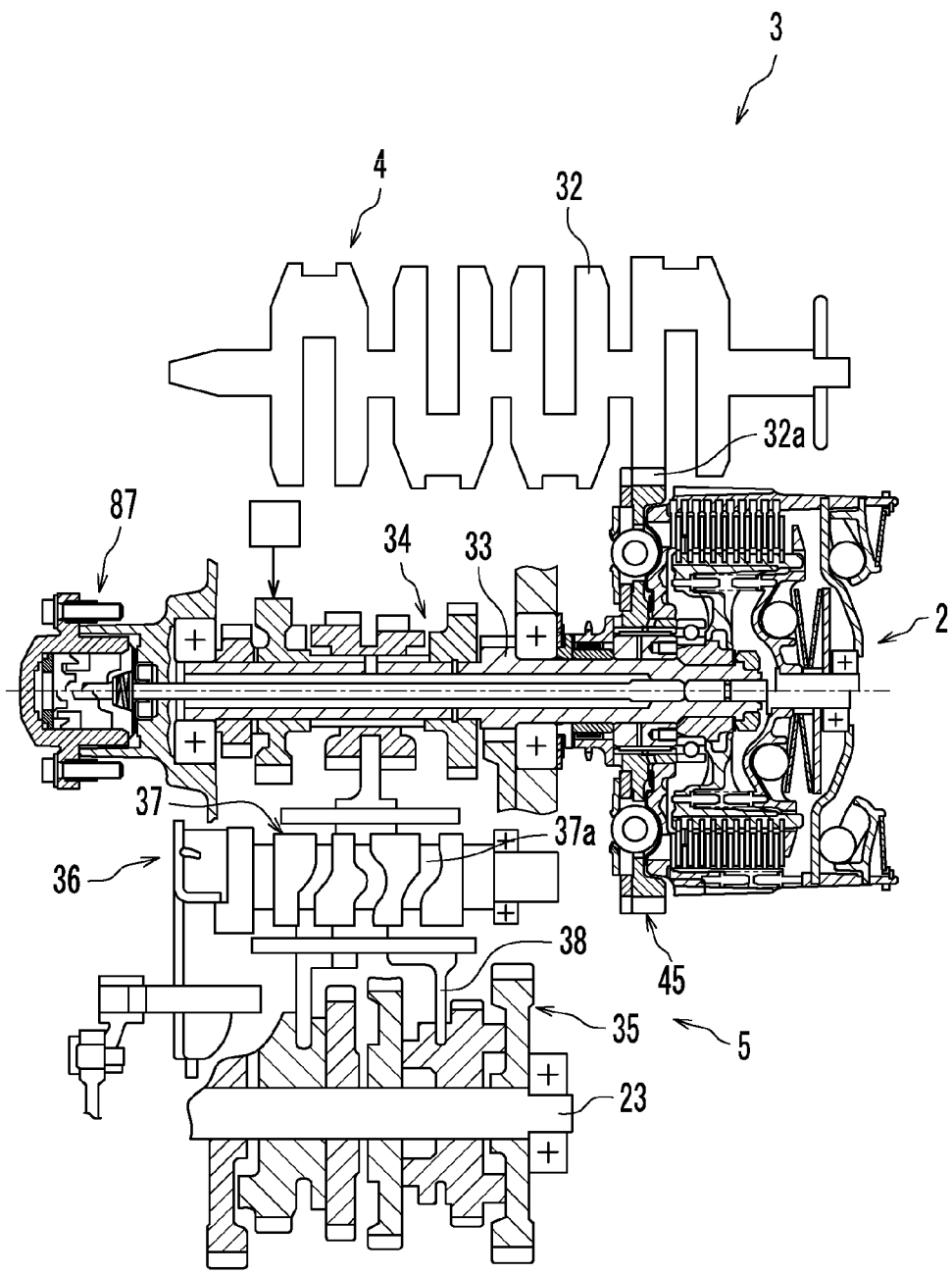
FIG. 2 is a schematic view of a power unit using the clutch shown in FIG. 1.

FIG. 1 depicts centrifugal clutch 2 having an upper side part and a lower side part relative to an axis line AX, the upper side part being in a different state from that of the lower side part. Specifically, the upper side part relative to the axis line AX represents a state in which the plate group 66 is not pressure-contacted. The lower side part relative to the axis line AX represents a state in which the plate group 66 is pressure-contacted. FIG. 2 shows only a portion of a power unit 3 to facilitate the description.

FIG. 1 is a cross-sectional view of centrifugal clutch 2 according to this embodiment. FIG. 2 is a schematic view of the power unit 3 using the centrifugal clutch 2. FIG. 3 is a left side view of the motorcycle 1 using the power unit 3.

The structural parts of motorcycle 1, as shown schematically in reference to FIG. 3, will be described in general hereinbelow. As shown in FIG. 3, the motorcycle 1 is provided with a vehicle body frame 10. The vehicle body frame 10 includes a head pipe 11. A handlebar 12 is attached to the upper portion of the head pipe 11. On the other hand, a front wheel 14 is rotatably attached to the lower portion of the head pipe 11 via a front fork 13.

A fuel tank 15 is attached to vehicle body frame 10. A seat 16 is arranged almost centrally in front and back directions of the vehicle body.

The power unit 3 is suspended on the vehicle body frame 10. A pivot axis 17 is provided on the rear half portion of the vehicle body frame 10. A rear arm 18 is swingably supported by the pivot axis 17. The rear arm 18 is supported by the vehicle body frame 10 via a link mechanism 20 and a rear cushion unit 21.

A rear wheel 19 is rotatably attached to the rear end portion of the rear arm 18. A driven sprocket 22 is provided on the rear wheel 19. On the other hand, a drive sprocket 24 is provided on a drive shaft 23 of the power unit 3. A chain 25, being used as a drive force transmission mechanism, is wound around the drive sprocket 24 and the driven sprocket 22. Power generated by power unit 3 is transmitted to rear wheel 19 via chain 25 to rotate the same.

A drive force transmission mechanism which transmits the power from the power unit 3 to the rear wheel 19 is not limited to chain 25 of the present embodiment. The drive force transmission mechanism may be constituted, for example, by a drive shaft or a belt or the like.

1. Power unit 3

Next, the constitution of the power unit 3 will be described in detail with reference mainly to FIG. 2. As shown in FIG. 2, the power unit 3 is provided with an engine 4, a transmission mechanism 5, and the centrifugal clutch 2. In the present invention, the kind of engine is not particularly limited. In this embodiment, an example in which the engine 4 is a water cooled four-cycle parallel four-cylinder engine will be described.

2. Engine 4

The engine 4 is arranged so that a cylinder shaft (not shown) extends rather obliquely and upwardly toward the forward portion of the vehicle body. The engine 4 is provided with a crankcase 31 and a crankshaft 32 as shown in FIG. 3. The crankshaft 32 is stored in the crankcase 31. The crankshaft 32 is arranged so as to extend in the vehicle-width direction.

3. Transmission Mechanism 5

As shown in FIG. 2, the crankshaft 32 is connected to the transmission mechanism 5 via the centrifugal clutch 2. The transmission mechanism 5 is provided with a main shaft 33, drive shaft 23 and a gear selection mechanism 36. The main shaft 33 is connected to the crankshaft 32 via the centrifugal clutch 2. The main shaft 33 and the drive shaft 23 are respectively arranged substantially in parallel with crankshaft 32.

A multistage transmission gear 34 is attached to the main shaft 33. On the other hand, a plurality of transmission gears 35 corresponding to the multistage transmission gear 34 are attached to the drive shaft 23. Only the selected pair of gears of the plurality of transmission gears 34 and plurality of transmission gears 35 are meshed with each other. At least one of the plurality of transmission gears 34 (other than the selected transmission gear 34 among the plurality of transmission gears 34) and the plurality of transmission gears 35 (other than the selected transmission gear 35 among the plurality of transmission gears 35) can be rotated with respect to the main shaft 33 or the drive shaft 23, respectively. That is, at least one of the transmission gears 34 (which is not selected) and the transmission gears 35 (which is not selected) idles with respect to the main shaft 33 or the drive shaft 23. That is, the rotation transmission between the main shaft 33 and the drive shaft 23 is carried out via only the selected transmission gear 34 and selected transmission gear 35 which are meshed with each other.

The selection of the transmission gears 34 and 35 is carried out by the gear selection mechanism 36. Specifically, the selection of transmission gears 34 and 35 is carried out by a shift cam 37 of the gear selection mechanism 36. A plurality of cam grooves 37a are formed in the outer circumferential surface of the shift cam 37. Each of shift forks 38 is attached to each of the cam grooves 37a. Each of the shift forks 38 is respectively engaged with the prescribed transmission gears 34 and 35 of the main shaft 33 and drive shaft 23. The rotation of the shift cam 37 guides each of the plurality of shift forks 38 in each of the cam grooves 37a to move each of the shift forks 38 in the axial direction of the main shaft 33. Thereby, the gears meshed with each other of the transmission gears 34 and 35 are selected.

Specifically, only a pair of gears (of the plurality of transmission gears 34 and 35) at a position corresponding to the rotation angle of the shift cam 37 are respectively in a fixed state due to a spline with respect to the main shaft 33 and the drive shaft 23. Thereby, the position of the transmission gear is determined, and the rotation transmission is carried out at a prescribed transmission ratio between the main shaft 33 and the drive shaft 23 via the transmission gears 34 and 35. As a result, the power is transmitted to the rear wheel 19 via the chain 25 shown in FIG. 3, and the rear wheel 19 is rotated.

The gear selection mechanism 36 is operated by a shift pedal which is not shown.

4. Centrifugal Clutch 2

Next, the structure of centrifugal clutch 2 will be described in detail with reference mainly to FIG. 1. The centrifugal clutch 2 can be operated by a rider. In this embodiment, an example in which the centrifugal clutch 2 is constituted as a wet multiple disk type friction clutch will be described.

5. Input Clutch Member 44 (=Clutch Housing 46)

The centrifugal clutch 2 is provided with an input side clutch member 44. The input side clutch member 44 is rotated around the axis line AX of the main shaft 33. In this embodiment, the input side clutch member 44 is constituted by a clutch housing 46. The clutch housing 46, which has one end closed, is formed generally into a cylindrical shape. The main shaft 33 is made to penetrate through the clutch housing 46. The clutch housing 46 has the same axis line AX as that of the main shaft 33.

Figure 4:
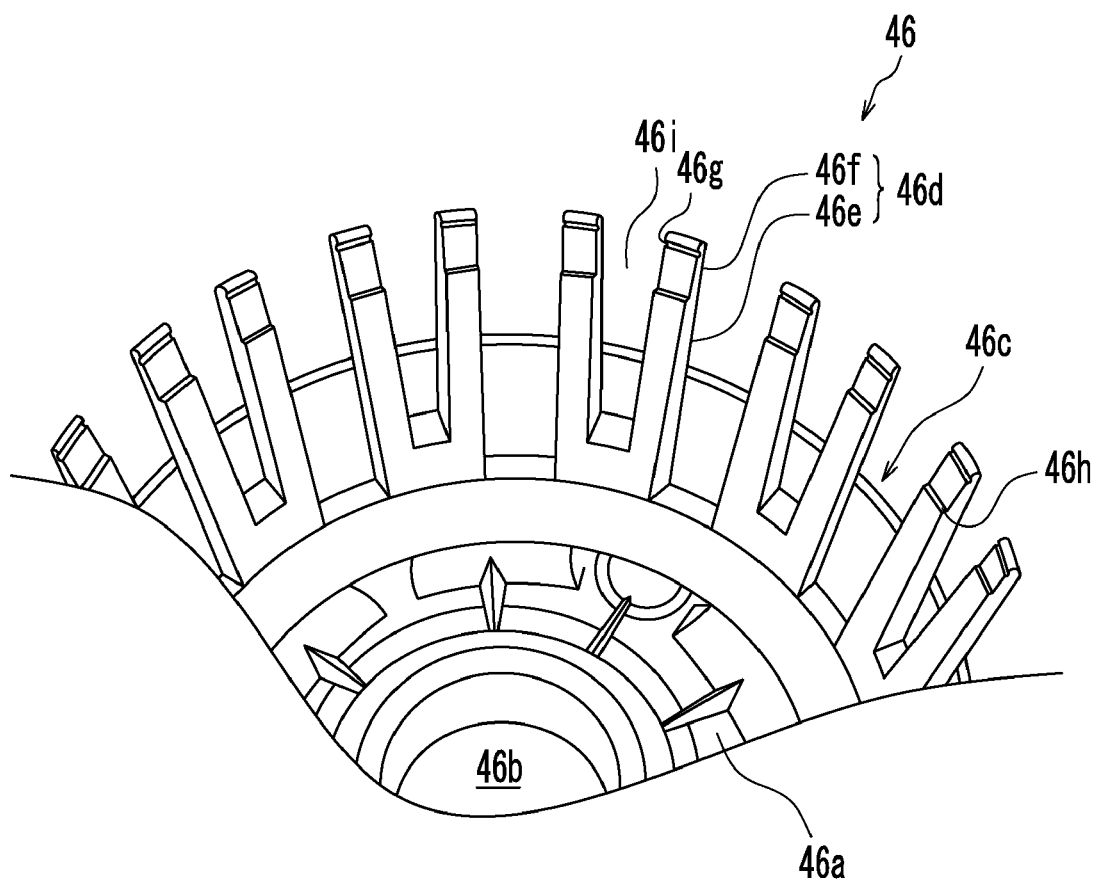
FIG. 4 is a partial perspective view of a clutch housing viewed obliquely from the top.

FIG. 4 is a perspective view of the clutch housing 46 when viewed obliquely from the top. As shown in FIG. 4, the clutch housing 46 is provided with a housing body 46c. The housing body 46c, which has one end closed by a bottom portion 46a, is formed generally into a cylindrical shape. An insertion hole 46b, into which the main shaft 33 is inserted, is formed in the bottom portion 46a. A plurality of pairs of arms 46d are provided on the housing body 46c. Each of the arms 46d is formed so as to project inwardly in the diameter direction from the inner circumferential surface of the housing body 46c.

Each of the arms 46d extends outwardly in the vehicle-width direction from the bottom portion 46a. Each of the arms 46d has an inner side part 46e located relatively on the inside in the vehicle-width direction and an outer side part 46f located relatively on the outside in the vehicle-width direction. The thickness in the diameter direction of the inner side part 46e is thicker than that of the outer side part 46f. Thereby, an end surface 46h is formed in the boundary between the inner side part 46e and the outer side part 46f. A linear groove 46g extending in the circumferential direction is formed in the tip portion of the outer side part 46f.

As shown in FIG. 1, a scissors gear 45 is attached to the clutch housing 46. Specifically, the clutch housing 46 is non-rotatably fixed to a gear 45a to be described below. The axis line of the scissors gear 45 is common with that of the clutch housing 46. As shown in FIG. 2, the scissors gear 45 is meshed with a gear 32a of the crankshaft 32. Thereby, the scissors gear 45 and clutch housing 46 are integrally rotated with the rotation of the crankshaft 32.

Specifically, as shown in FIG. 1, the scissors gear 45 is provided with two gears 45a and 45b, a spring 49 and two plates 51 and 52. The gear 45a and the gear 45b are located between these two plates 51 and 52. Plates 51 and 52 are fixed to each other by a fixing means such as a rivet and a screw or the like in the axial direction of the main shaft 33. Thereby, the two gears 45a and 45b are fixed to each other substantially in the axial direction of the main shaft 33. On the other hand, the gear 45a and the gear 45b may be mutually rotated relative to the rotation direction.

The number of teeth on gear 45a is equal to the number of teeth on gear 45b. Gears 45a and 45b are arranged so that the teeth of the gears 45a, 46b are alternately located in the circumferential direction. The spring 49 is provided between the gear 45a and the gear 45b. Therefore, squeeze torque is applied to the gear 45a and the gear 45b by the spring 49. The variable torque of the engine 4 can thus be absorbed.

A needle bearing 53 and a spacer 54, which are non-rotatably fixed to main shaft 33, are arranged between the scissors gear 45 and the main shaft 33. The scissors gear 45 can be rotated with respect to the main shaft 33 by needle bearing 53. That is, the rotation of the scissors gear 45 is not directly transmitted to the main shaft 33.

A sprocket 55 is in contact with the inner terminal surface of the scissors gear 45 in the vehicle-width direction. Sprocket 55 drives an oil pump or the like (not shown). The main shaft 33 is inserted into the sprocket 55. The sprocket 55 has the same axis line AX as that of the main shaft 33. A bearing 56 and a collar 57 are arranged between the sprocket 55 and the main shaft 33. The collar 57 is non-rotatably fixed to the main shaft 33. The bearing 56 is arranged between the collar 57 and the sprocket 55. Thereby, the sprocket 55 can be rotated with respect to the main shaft 33. Therefore, the sprocket 55 is rotated with the scissors gear 45 aside from the main shaft 33. As a result, the oil pump or the like connected to the sprocket 55 is driven by the power transmission means such as the belt and the chain.

A spacer 59 and a bearing 58 are arranged farther inwardly than the collar 57 in the vehicle-width direction. While the spacer 59 is in contact with the collar 57, the spacer 59 is not in contact with the sprocket 55. While the spacer 59 is in contact with an inner ring 58a of the bearing 58, the spacer 59 is not in contact with an outer ring 58b of the bearing 58.

Figure 7:
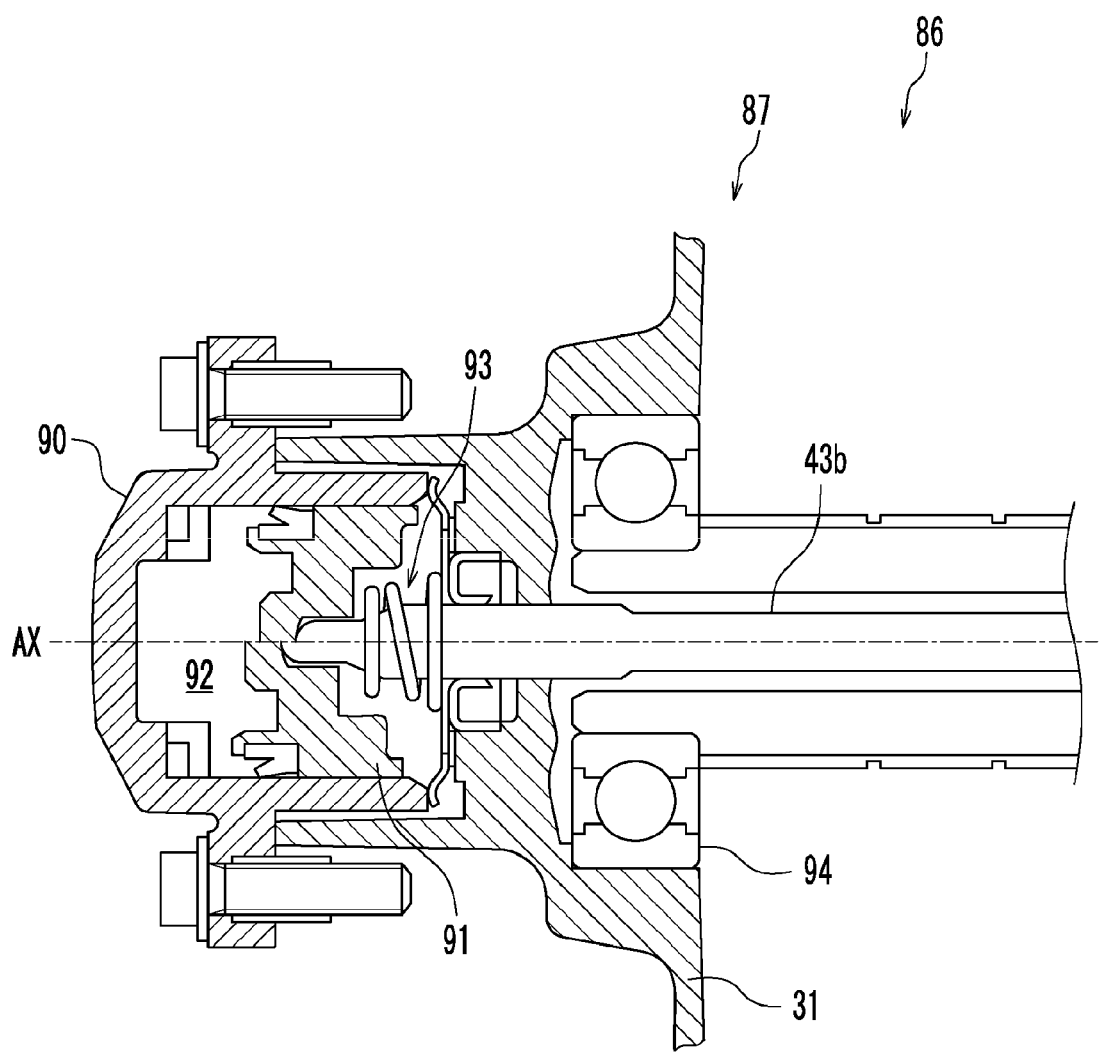
FIG. 7 is a cross-sectional view of a pushrod driving mechanism.

The outer ring 58b of the bearing 58 is fixed to the crankcase 31. That is, the right side end portion of the main shaft 33 is rotatably supported to the crankcase 31 by the bearing 58. On the other hand, as shown in FIG. 7, the left side end portion of the main shaft 33 is rotatably supported to the crankcase 31 by a bearing 94.

The bearing 58 is non-displaceably attached to the main shaft 33 in the direction of the axis line AX of the main shaft 33. On the other hand, a thrust bearing 63 is arranged between a clutch boss 48 and the scissors gear 45. The scissors gear 45, the needle bearing 53, the spacer 54, the sprocket 55, the bearing 56, the collar 57 and the spacer 59 are fixed in the direction of the axis line AX of the main shaft 33 by the bearing 58 and the thrust bearing 63.

A disc spring 61 and a washer 62 are arranged between the spacer 59 and the bearing 58. The washer 62 is in contact with only the outer ring 58b of the bearing 58. The washer 62 is biased inwardly in the direction of the axis line AX of the main shaft 33 by the disc spring 61. In other words, the washer 62 is biased to the side of the outer ring 58b of the bearing 58 by the disc spring 61. Thereby, the rotation of the main shaft 33 causes sliding resistance at at least one boundary between the disc spring 61 and the washer 62 and at a boundary between the washer 62 and the outer ring 58b. This sliding resistance becomes rotational resistance when the main shaft 33 is rotated, for example, in a state where the centrifugal clutch 2 is disengaged. Thereby, for example, when the centrifugal clutch 2 is disengaged, the rotation of the main shaft 33 is settled relatively early.

6. Plate Group 66

A plurality of friction plates 64, serving as input side clutch plates, are operatively arranged inside clutch housing 46. Each of the friction plates 64 is fixed to the clutch housing 46 with respect to the rotational direction of the main shaft 33. Thereby, the plurality of friction plates 64 are rotated with the clutch housing 46. Each of the friction plates 64 can be displaced in the direction of the axis line AX of the main shaft 33. Thereby, the distance between the mutually adjacent friction plates 64 is variable.

The plurality of friction plates 64 are arranged in the direction of the axis line AX of the main shaft 33. Clutch plates 65, serving as output side clutch plates, are respectively arranged between the mutually adjacent friction plates 64. The clutch plate 65 faces the adjacent friction plate 64 so as to be displaceable in the direction of the axis line AX of the main shaft 33. Each of the clutch plates 65 is fixed to the clutch boss 48 in the direction of the axis line AX of the main shaft 33. Thereby, the plurality of clutch plates 65 are rotated with the clutch boss 48. Each of the clutch plates 65 can be displaced in the direction of the axis line AX of the main shaft 33. Thereby, the distance between the mutually adjacent clutch plates 65 is variable.

In this embodiment, the plate group 66 is constituted by the plurality of friction plates 64 and the plurality of clutch plates 65.

A judder spring for smoothing load changes when the centrifugal clutch 2 is connected may be attached to the plate group 66. Specifically, for example, the judder spring may be arranged between the clutch plate 65 and the friction plates 64 to bias the clutch plate 65 and the friction plate 64 in the direction of separating one from the other.

7. Output Side Clutch Member 47 (=Clutch Boss 48)

The clutch boss 48, which serves as the output side clutch member 47, is arranged inside the clutch housing 46. The clutch boss 48 is non-rotatably fixed to the main shaft 33 by a nut 67. That is, the clutch boss 48 is rotated around the axis line AX with the main shaft 33.

8. Roller Retainer 69

A shaft 68 is arranged further outwardly than the main shaft 33 in the vehicle-width direction. The shaft 68 is press-fitted between the main shaft 33 and a pressure plate 77. The shaft 68 is rotated with the main shaft 33. The shaft 68 can be displaced in the direction of the axis line AX of the main shaft 33. The roller retainer 69 is attached to the shaft 68. The roller retainer 69 cannot be rotated with respect to the shaft 68. That is, the roller retainer 69 is rotated with the shaft 68. On the other hand, in the axial direction of the shaft 68, the roller retainer 69 can be displaced with respect to the shaft 68.

The roller retainer 69 extends outwardly in the diameter direction from the shaft 68. An end portion on the outside in the diameter direction of the roller retainer 69 faces the plate group 66 in the direction of the axis line AX of the main shaft 33. The roller retainer 69 is displaced inwardly in the vehicle-width direction with the shaft 68, and thereby the distance between the roller retainer 69 and the bottom portion 46a of the clutch housing 46 is shortened. Thereby, the plate group 66 is directly pressed by the roller retainer 69. As a result, the plate group 66 transitions into a pressed-contact state. Specifically, the friction plates 64 and the clutch plates 65 mutually transition into the pressed-contact condition. Thereby, a frictional force with respect to the direction of rotation is generated between the friction plate 64 and the clutch plate 65. As a result, the clutch boss 48 is rotated with the clutch housing 46.

On the other hand, when the roller retainer 69 is displaced outwardly in the vehicle-width direction with the shaft 68, the distance between the roller retainer 69 and the bottom portion 46a of the clutch housing 46 is lengthened. Thereby, the pressed-contact state of the plate group 66 is released. Therefore, the frictional force with respect to the direction of rotation between the friction plate 64 and the clutch plate 65 is relatively reduced. As a result, the rotation of the clutch housing 46 is not transmitted to the clutch boss 48.

Thus, in this embodiment, the roller retainer 69 is displaced inwardly and outwardly in the vehicle-width direction, and thereby the intermittence of the centrifugal clutch 2 may be carried out.

A plurality of output side offsprings 71, which serve as output side biasing members, are arranged at equal spacing along the circumferential direction between the clutch boss 48 and the roller retainer 69. The roller retainer 69 is biased in a direction of being separated from the plate group 66 by the plurality of output side offsprings 71. Thereby, the roller retainer 69 is in a state where it is relatively separated from the bottom portion 46a of the clutch housing 46 in a state where a biasing force acting inwardly in the vehicle-width direction is not applied to the roller retainer 69. Therefore, the plate group 66 is in a non-pressed contact state. The output side offspring 71 may comprise, for example, a compression coil spring.

The stronger the elastic force of the output side offspring 71, the more difficult it is for centrifugal clutch 2 to be connected. As a result, the centrifugal clutch 2 is easily disengaged. On the other hand, the weaker the elastic force of the output side offspring 71, the more easily centrifugal clutch 2 may be connected, but disengaging the centrifugal clutch becomes more difficult. Therefore, the timing of the intermittence of the centrifugal clutch 2 can be controlled by adjusting the elastic force of the output side offspring 71.

A plurality of cam surfaces 69a are formed in the opposite surface of the roller retainer 69 relative to the plate group 66. The plurality of cam surfaces 69a is located inside the plate group 66 in the diameter direction. The plurality of cam surfaces 69a is radially arranged around the axis line AX of the main shaft 33. Each of the cam surfaces 69a extends outwardly in the vehicle-width direction as it goes outwardly in the diameter direction.

9. Output Side Retainer 72

The output side retainer 72 is attached to the shaft 68. The output side retainer 72 is non-rotatably attached to the shaft 68 so as to be non-displaceable in the direction of the axis line AX. The output side retainer 72 faces the opposite surface of the roller retainer 69 relative to the plate group 66. In other words, the output side retainer 72 faces the cam surface 69a. The output side retainer 72 and each cam surface 69a of the roller retainer 69 form a space 70 which narrows with increased distance from the axis line AX.

Specifically, the output side retainer 72 is provided with a spring stopper plate 73 and a spring 74. The spring stopper plate 73 is fixed to the shaft 68.

Specifically, the spring 74 comprises two disc springs 74a and 74b formed into a substantially ring-belt shape. The disc spring 74a extends outwardly in the vehicle-width direction and outwardly in the diameter direction. The outer side end in the diameter direction of the disc spring 74a is blocked by the spring stopper plate 73. The inner side end of the disc spring 74b is in contact with the inner side end of the disc spring 74a. The disc spring 74b extends inwardly in the vehicle-width direction and outwardly in the diameter direction. The above space 70 is formed by the disc spring 74b and the cam surface 69a. A collar washer 76 is arranged between the spring 74 and the shaft 68. Direct contact of the shaft 68 and spring 74 is suppressed by the collar washer 76.

A comparatively uniform biasing force can be generated in the circumferential direction by using the disc springs 74a and 74b (as spring 74) in this embodiment. Thereby, the roller retainer 69 can be pressed by a relatively uniform force in the circumferential direction. As a result, the uneven adhesion of the plate group 66 can be decreased in the circumferential direction, and the plate group 66 can be more suitably adhered.

10. Output Side Roller Weight 42

An output side pressing body 40b is arranged in the space 70. The output side pressing body 40b is constituted by a plurality of output side roller weights 42. The output side roller weights 42 revolve with the rotation of the shaft 68. The roller retainer 69 is pressed to the side of the plate group 66 by the centrifugal force generated by the revolution, and the movement of the output side roller weights 42 away from the axis line AX while pressing the spring 74 outwardly in the vehicle-width direction. As a result, the roller retainer 69 is moved to the side of the plate group 66, and the plate group 66 transitions into a pressed-contact state.

The shape of the output side roller weights 42 is not limited to any particular shape as long as the shape enables the revolution of the output side roller weight 42 with the rotation of the shaft 68 and the movement of the output side roller weight 42 inside and outside in the diameter direction. Specifically, in this embodiment, the output side roller weight 42 is formed into a substantially cylindrical shape.

More specifically, each of the output side roller weights 42 is divided into a central part and two side parts with respect to the axial direction of the output side roller weight 42. Both side parts cannot be mutually rotated. On the other hand, the central part can be rotated with respect to both side parts. The cam surface 69a is formed so as to be in contact with only the central part. In other words, only the central part being in contact with the cam surface 69a can be rotated with respect to the other parts. Thereby, the sliding friction between the cam surface 69a and the output side roller weight 42 can be reduced. As a result, the wear of the output side roller weight 42 can be suppressed.

11. Pressure Plate 77 and Roller Retainer 78

The pressure plate 77, which serves as the pressure member, is arranged on the right relative to the plate group 66 in a vehicle-width direction. The pressure plate 77 is non-rotatably attached to an outer ring 75b of a bearing 75. The outer side end portion of the pressure plate 77 in the diameter direction is engaged with a plurality of arms 46d shown in FIG. 4. Thereby, the pressure plate 77 cannot be rotated with respect to the clutch housing 46. In other words, the pressure plate 77 is rotated with the clutch housing 46. On the other hand, in the direction of axis line AX, the pressure plate 77 can be displaced with respect to the clutch housing 46.

A plurality of input side offsprings 79, which serve as an input side biasing member are equally spaced along the circumferential direction of the clutch housing 46 between the pressure plate 77 and the clutch housing 46. Specifically, the plurality of input side offsprings 79 are respectively arranged in each of gaps 46i of the pair of arms 46d shown in FIG. 4. The input side offspring 79 comprises a compression coil spring in the present embodiment. The pressure plate 77 is biased outwardly in the vehicle-width direction by the input side offspring 79. That is, the pressure plate 77 is biased in a direction of being separated from the plate group 66 by the input side offspring 79.

Thus, in this embodiment, the pressure plate 77, as the pressure member, indirectly presses the roller retainer 69 via the bearing 75 and the shaft 68. Thereby, the pressure plate 77 indirectly presses the plate group 66.

The pressure plate 77, as the pressure member, indirectly presses the plate group 66 from the same direction as the direction in which the roller retainer 69 presses the plate group 66.

The roller retainer 78 is arranged outside the pressure plate 77 in the vehicle-width direction. The roller retainer 78 is formed into a ring-belt shape when viewed from axis line AX. The roller retainer 78 faces the opposite surface to the plate group 66 of the pressure plate 77. A plurality of cam surfaces 81 are formed in the surface of the roller retainer 78 on the side of the pressure plate 77. The plurality of cam surfaces 81 are radially arranged around the axis line AX. Each of the cam surfaces 81 is formed so as to extend inwardly in the vehicle-width direction as it goes outwardly in the diameter direction. Thereby, a space 82, which is narrower with increased distance from the axis line AX, is formed between each of the cam surfaces 81 and the pressure plate 77.

An outer side end portion 78b of the roller retainer 78 in the diameter direction is engaged with the plurality of arms 46d shown in FIG. 4 as well as the pressure plate 77. In other words, the outer side end portion of the roller retainer 78 in the diameter direction is directly supported by the clutch housing 46. Thereby, the roller retainer 78 cannot be rotated with respect to the clutch housing 46. In other words, the roller retainer 78 is rotated with the clutch housing 46. On the other hand, the roller retainer 78 can be displaced with respect to the clutch housing 46 in the direction of the axis line AX.

12. Disc Spring 83

The disc spring 83, which serves as a biasing member is arranged on the right relative to the roller retainer 78 in the vehicle-width direction. The disc spring 83 is a kind of plate spring. The disc spring 83 is formed substantially into a ring-belt shape. The disc spring 83 is provided between the clutch housing 46 and the roller retainer 78. The disc spring 83 extends in a direction of being inclined to the axis line AX toward the inner side end portion 83a from the outer side end portion 83b in the centrifugal direction. In other words, the disc spring 83 extends nearer to the roller retainer 78 toward the inner side end portion 83a and nearer to the axis line AX from the outer side end portion 83b in the centrifugal direction.

As shown in FIG. 1, the length in the centrifugal direction of the disc spring 83 is set so that the inner side end portion 83a in the centrifugal direction of the disc spring 83 is separated from the axis line AX as compared with the end portion nearer the axis line AX of an input side roller weight 41 when the input side roller weight 41 is located closest to the axis line AX.

As described hereinafter, the outer side end portion 83b of the disc spring 83 in the centrifugal direction is directly fixed to the clutch housing 46 by a spring stopper 84 and a circlip 85. On the other hand, the inner side end portion 83a of the disc spring 83 in the centrifugal direction is directly in contact with the roller retainer 78. Thereby, the roller retainer 78 is directly biased inwardly in the direction of the axis line AX by the inner side end portion 83a in the centrifugal direction of the disc spring 83.

The roller retainer 78 is biased inwardly in the vehicle-width direction by the disc spring 83, which is a kind of plate spring. In other words, the roller retainer 78 is biased to the side of the plate group 66 by the disc spring 83.

Figure 5:
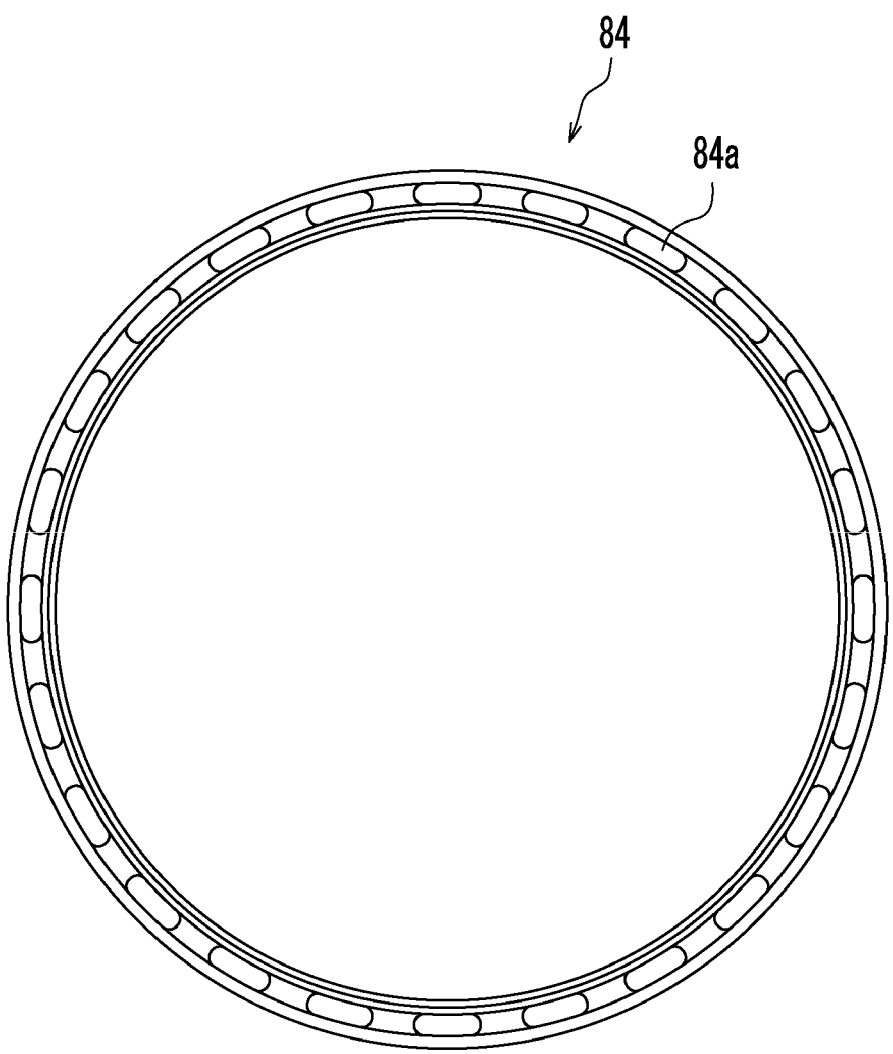
FIG. 5 is a plan view of a spring stopper.

As shown in FIG. 5, a plurality of openings 84a arranged in the circumferential direction are formed in the ring-shaped spring stopper 84. The arms 46d (see FIG. 4) of the clutch housing 46 are inserted into the openings 84a. Thereby, the deformation of the arms 46d of the clutch housing 46 is suppressed.

The disc spring 83 is in contact with the inner portion of the spring stopper 84 in the diameter direction. On the other hand, the radially outer portion of the spring stopper 84 is in contact with the end surface 46h formed on the arm 46d. Thereby, the spring stopper 84 is not moved to the left relative to the end surface 46h in the vehicle-width direction.

Figure 6:
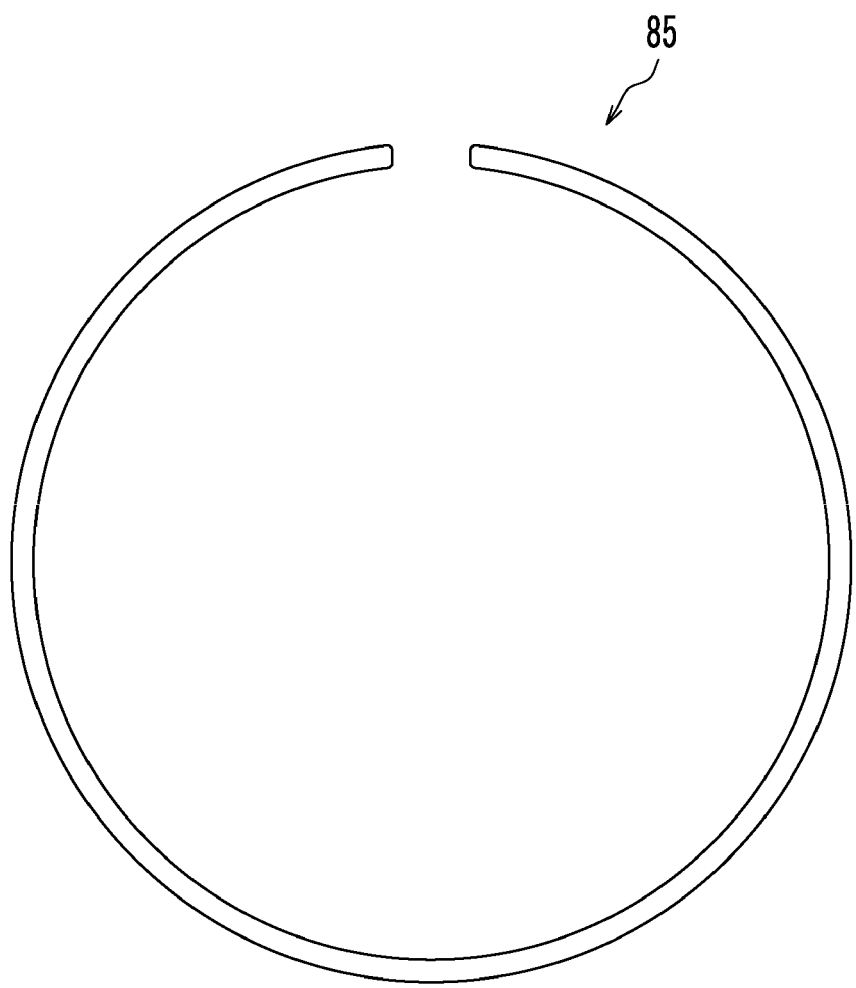
FIG. 6 is a plan view of a circlip.

As shown in FIG. 6, the circlip 85 is formed into a ring shape having a notched part. This circlip 85 is fitted into the linear groove 46g (FIG. 4) formed in the arm 46d. Thereby, the movement of the circlip 85 in the direction of the axis line AX is regulated, and the movement of the spring stopper 84 is also regulated. That is, the spring stopper 84 is fixed by the circlip 85 and the end surface 46h formed in the arm 46d in the direction of the axis line AX. As a result, the outer side end portion of the disc spring 83 in the diameter direction is fixed in the direction of the axis line AX. Thus, according to the method for fixing the disc spring 83 using the circlip 85, the disc spring 83 may be easily fixed. In addition, the disc spring 83 may be easily removed.

As described hereinabove, the roller retainer 78 is biased to the side of the plate group 66 in the direction of the axis line AX by the disc spring 83. The biasing force of the disc spring 83 biases the shaft 68 (to which the output side retainer 72 is attached) to the side of the plate group 66 via the input side roller weight 41 and the pressure plate 77. Therefore, the output side retainer 72 is also biased to the side of the plate group 66 in the direction of the axis line AX by the disc spring 83.

Figure 10:
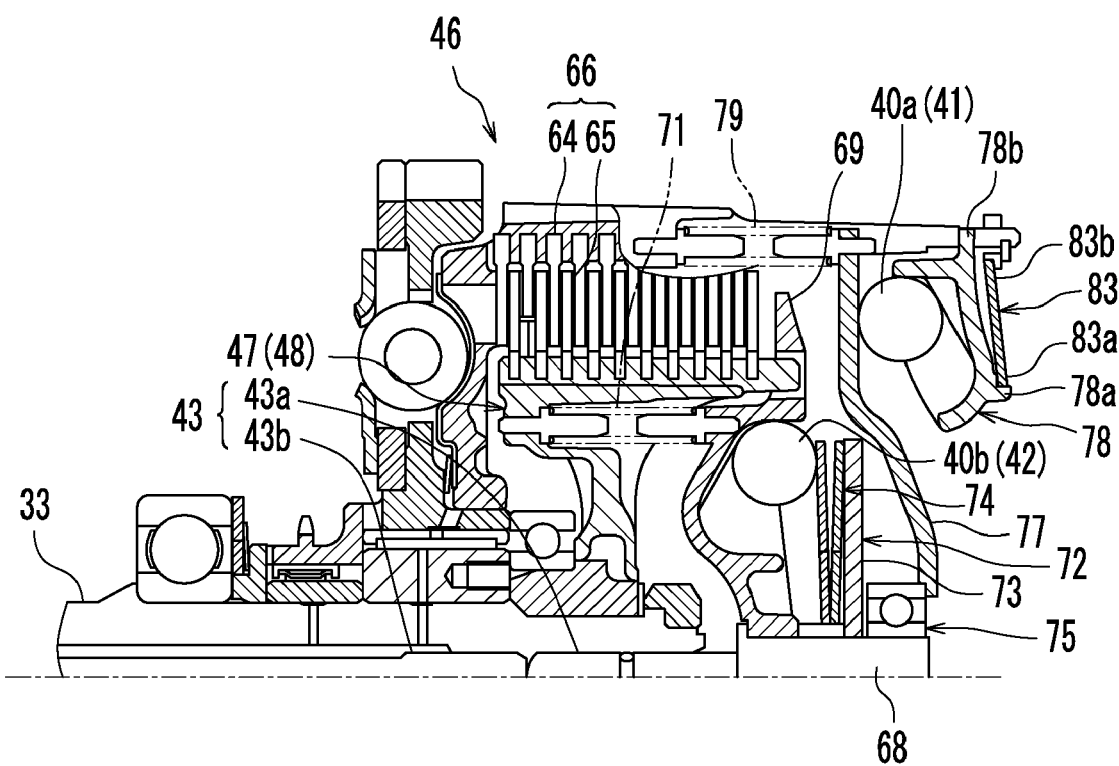
FIG. 10 is a cross-sectional view showing a state when the clutch of FIG. 1 is forcibly disengaged by a clutch release mechanism.

While described in detail hereinafter, as shown in FIGS. 1 and 10 or the like, in this embodiment, a supporting portion 78a (of the roller retainer 78), which supports the disc spring 83, is located on the right relative to the outer side end portion 78b of the roller retainer 78, which is supported by the clutch housing 46, in the vehicle-width direction. Thereby, as shown in FIG. 10, when the pressure plate 77 is located on the rightmost side in the vehicle-width direction, the disc spring 83 is transformed until the inner side end portion 83a in the diameter direction of the disc spring 83 is located on the right relative to the outer side end portion 83b in the vehicle-width direction.

13. Input Side Roller Weight 41

An input side pressing body 40a is arranged in the space 82. The input side pressing body 40a is constituted by the plurality of input side roller weights 41. The input side roller weight 41 is more remotely located from the plate group 66 as compared with the output side roller weight 42 in the direction of the axis line AX. That is, the input side roller weight 41 is located on the right relative to the output side roller weight 42 in the direction of the axis line AX. Alternatively, the input side roller weight 41 is more remotely located from the axis line AX as compared with the output side roller weight 42 in the diameter direction perpendicular to the axis line AX. Thus, the positional interference between the input side roller weight 41 and the output side roller weight 42 can be suppressed by obliquely arranging the input side roller weight 41 and the output side roller weight 42 with respect to the axis line AX. As a result, the centrifugal clutch 2 can be compactified.

The input side roller weight 41 is revolved with the rotation of the clutch housing 46. The pressure plate 77 is pressed to the side of the plate group 66 by the centrifugal force generated by the revolution, and the input side roller weight 41 moves away from the axis line AX while pressing the spring 74 outwardly in the vehicle-width direction. Thereby, the roller retainer 69 moves to the side of the plate group 66, and the plate group 66 transitions into the pressed-contact state.

The shape of the input side roller weight 41 is not particularly limited as long as the shape enables the revolution of the input side roller weight 41 with the rotation of the shaft 68 and the movement of the input side roller weight 41 inside and outside in the diameter direction. Specifically, in this embodiment, the input side roller weight 41 is formed into a substantially cylindrical shape.

More specifically, the input side roller weight 41 is divided into a central part and two side parts with respect to the axial direction of the input side roller weight 41. Both side parts cannot be mutually rotated. On the other hand, the central part can be rotated with respect to both side parts. A cam surface 81 is formed so as to be in contact with only the central part. In other words, only the central part, which is in contact with the cam surface 81, can be rotated with respect to the other parts. Thereby, sliding friction between the cam surface 81 and the input side roller weight 41 can be reduced. As a result, the wear of the input side roller weight 41 can be suppressed.

14. Weight of Input Side Roller Weight 41 and Output Side Roller Weight 42

In this embodiment, the total weight of the plurality of output side roller weights 42 is set more heavily than the total weight of the plurality of input side roller weights 41. For example, the output side roller weights 42 and the input side roller weights 41 are respectively provided for the same quantity, and the weight per each output side roller weight 42 may be set more heavily than the weight per each input side roller weight 41. The weight per one output side roller weight 42 and the weight per one input side roller weight 41 may be approximately identical, and the number of the output side roller weights 42 may be more than that of the input side roller weights 41. Alternatively, the number of the output side roller weights 42 may be more than that of the input side roller weights 41, and the weight per one output side roller weight 42 may be set more heavily than the weight per one input side roller weight 41.

15. Biasing Force of Input Side Offspring 79 and Output Side Offspring 71

In this embodiment, the total biasing force of the plurality of output side offsprings 71 is set to be weaker than the total biasing force of the plurality of input side offsprings 79. Thus, the rotational speed of the clutch boss 48 that starts the movement of the output side roller weight 42 in the centrifugal direction is set to be lower than that of the clutch housing 46 that starts the movement of the input side roller weight 41 in the centrifugal direction by appropriately setting the total weight of the plurality of output side roller weights 42 and plurality of input side roller weights 41, and the total biasing force of the plurality of output side offsprings 71 and input side offsprings 79.

Specifically, the output side offsprings 71 and the input side offsprings 79 are provided for the same quantity, and the biasing force of each of the output side offsprings 71 may be set to be weaker than the biasing force of each of the input side offsprings 79. The biasing force of each of the output side offsprings 71 and the biasing force of each of the input side offsprings 79 may be approximately identical, and the number of the output side offsprings 71 may be less than that of the input side offsprings 79. Alternatively, the number of the output side offsprings 71 may be larger than that of the input side offsprings 79, and the biasing force of each of the output side offsprings 71 may be set to be weaker than the biasing force of each of the input side offsprings 79.

16. Clutch Release Mechanism 86

The clutch release mechanism 86, which serves as a press contact release mechanism, is provided in the centrifugal clutch 2 of this embodiment. The clutch release mechanism 86 forcibly releases the pressed-contact state of the plate group 66 using a force applied by the rider of the motorcycle 1. The rider of the motorcycle 1 can disengage the centrifugal clutch 2 using the clutch release mechanism 86.

This embodiment describes an example in which the rider of the motorcycle 1 operates a clutch operation means such as a clutch lever, a clutch pedal, or the like (not shown), thereby applying the force applied to the clutch lever or the clutch pedal to the clutch release mechanism 86 to forcibly release the pressed-contact state of the plate group 66. However, the present invention is not limited thereto. For example, the rider of the motorcycle 1 may operate the clutch lever or clutch pedal (not shown), thereby operating a driving mechanism such as an oil pump, which may be separately provided, to apply the force generated by the oil pump to the clutch release mechanism 86 and to forcibly release the pressed-contact state of the plate group 66.

The clutch release mechanism 86 is provided with a pushrod 43 shown in FIGS. 1 and 2, and a pushrod driving mechanism 87 shown in FIGS. 2 and 7. As shown in FIG. 1, the pushrod 43 is arranged in a through-hole 33a formed in the main shaft 33 so as to penetrate the main shaft 33 in the direction of the axis line AX. The through-hole 33a serves as an oil supply hole for supplying oil to each of sliding parts or the like of the centrifugal clutch 2. Specifically, oil is supplied to each of the sliding parts of the centrifugal clutch 2 via a gap 89 (FIG. 1) between the inner wall of the through-hole 33a and the pushrod 43.

The pushrod 43 is provided with a short pushrod 43a and a long pushrod 43b. The short pushrod 43a is arranged relatively outside of the long push rod 43b in the vehicle-width direction. The right side end of the short pushrod 43a is in contact with the shaft 68. An O-ring 88 is attached to almost the center portion of the short pushrod 43a in the axial direction. This prevents the oil supplied via the gap 89 from reaching to the right relative to O-ring 88 in the vehicle-width direction. Alternatively, the short pushrod 43a is rotated with the main shaft 33 by providing the O-ring 88. On the other hand, the long pushrod 43b is not rotated with the main shaft 33. Thereby, when the main shaft 33 is rotated, the short pushrod 43a is rotated with respect to the long pushrod 43b. In view of this construction, the end surface of the short pushrod 43a on the side of the long pushrod 43b is formed into a curved surface projecting toward the side of the long pushrod 43b. Thereby, the sliding resistance between the short pushrod 43a and the long pushrod 43b when the short pushrod 43a is rotated is reduced.

As shown in FIGS. 2 and 7, the left side end of the long pushrod 43b is located on the left relative to the left side end of the main shaft 33, and extends into the pushrod driving mechanism 87. FIG. 7 is a cross-sectional view representing the pushrod driving mechanism 87. The part below the axis line AX of FIG. 7 represents a state where the clutch release mechanism 86 is not driven. In other words, the part below the axis line AX of FIG. 7 represents a state where the pushrod 43 is displaced to the left and thus the shaft 68 is not displaced to the right by the pushrod 43. On the other hand, the part above the axis line AX of FIG. 7 represents a state where the clutch release mechanism 86 is driven. In other words, the part above the axis line AX of FIG. 7 represents a state where the pushrod 43 is displaced to the right—relative to the nondriven state shown below the axis line AX—and thus the shaft 68 is displaced to the right by the pushrod 43.

As shown in FIG. 7, the pushrod driving mechanism 87 is provided with a cylinder 90 and a piston 91. The piston 91 is slidably moved in the direction of the axis line AX with respect to the cylinder 90. The piston 91 is attached to the long pushrod 43b. Thereby, the piston 91 is slidably moved, and the long pushrod 43b is also moved in the direction of the axis line AX.

As described above, the clutch release mechanism 86 is a mechanism for forcibly disengaging the centrifugal clutch 2 when the centrifugal clutch 2 is connected. Therefore, the clutch release mechanism 86 is usually used during high-speed rotation of the engine 4. As shown in FIG. 10, for example, the clutch release mechanism 86 is used when both roller weights 41 and 42 are located outwardly in the centrifugal direction. When the clutch release mechanism 86 is driven in a state in which both roller weights 41 and 42 are located outwardly in the centrifugal direction, the pressure plate 77 and the roller retainer 78 are further moved to the right in the vehicle-width direction by the pushrod 43. Therefore, in a state where both roller weights 41 and 42 are located on the outside in the centrifugal direction, a state where the clutch release mechanism 86 is driven and which is shown in FIG. 10 becomes a state where the roller retainer 78 is moved to the rightmost side in the vehicle-width direction.

Since the supporting part 78a of the roller retainer 78 is located on the right relative to the outer side end portion 78b in the vehicle-width direction in this embodiment, as shown in FIG. 10, in a state where the roller retainer 78 is moved to the rightmost side in the vehicle-width direction, the disc spring 83 is in a so-called inversely curved state. Specifically, the disc spring 83 (which has the inner side end portion 83a in the diameter direction located on the left relative to the outer side end portion 83b in the vehicle-width direction in a state where stress is not applied) is transformed until the inner side end portion 83a is located on the right relative to the outer side end portion 83b in the vehicle-width direction.

Between the piston 91 and the cylinder 90, an actuation chamber 92 is defined and formed. The actuation chamber 92 is filled with oil. The rider of the motorcycle 1 operates the clutch lever or the clutch pedal to increase the internal pressure in the actuation chamber 92. Thereby, the piston 91 and the long pushrod 43b are displaced to the right. Therefore, as shown in FIG. 10, the shaft 68, the pressure plate 77 and the output side retainer 72, which is attached to the shaft 68, are also displaced to the right. As a result, the roller retainer 69 is displaced to the right to release the pressed-contact condition of the plate group 66.

A compression coil spring 93 is arranged between the piston 91 and the crankcase 31. The piston 91 is biased to the left by the compression coil spring 93. That is, the pushrod 43 is biased to be displaced to the left in a direction in which the centrifugal clutch 2 is connected. Thereby, when the operation of the clutch lever or clutch pedal is released by the rider of the motorcycle 1, the pushrod 43 is certainly moved to the left.

For example, when the compression coil spring 93 is not provided, a situation where the pushrod 43 is still located on the right even if operation of the clutch lever or clutch pedal is released is also considered. For example, if the engine 4 is stopped and the centrifugal clutch 2 is not connected in such a situation, the pushrod 43 cannot be further moved to the right, and thereby the rider of the motorcycle 1 cannot operate the clutch lever or the clutch pedal. Therefore, for example, when the motorcycle 1 cannot start the engine 4 in a state where the clutch lever or the clutch pedal is not operated, the engine 4 cannot be started.

On the other hand, since the compression coil spring 93 is arranged as described above in the motorcycle 1 according to this embodiment, the generation of the situation where the pushrod 43 is still located on the right even if the operation of the clutch lever or clutch pedal is released is suppressed. Therefore, the rider of the motorcycle 1 can always operate the clutch lever or the clutch pedal in stopping the engine 4.

As described above, in this embodiment, the pressure plate 77, which serves as the pressure member, indirectly presses the plate group 66 from the same direction as the direction in which the roller retainer 69 presses the plate group 66.

For example, when the pressure plate 77 and the roller retainer 69 mutually press the plate group 66 from the opposite direction, the position of the pressure plate 77 when the centrifugal clutch 2 is disengaged is different according to a position of the roller retainer 69 in the direction of the axis line AX. Specifically, for example, when the roller retainer 69 is located relatively to the right in the direction of the axis line AX, the centrifugal clutch 2 is not disengaged if the pressure plate 77 is not displaced relatively to the right. On the other hand, for example, when the roller retainer 69 is located relatively to the left in the direction of the axis line AX, the centrifugal clutch 2 is disengaged, even if the pressure plate 77 is not displaced to the right so much. Thereby, when the pressure plate 77 and the roller retainer 69 mutually press the plate group 66 from the opposite direction, the position of the pushrod 43 when the centrifugal clutch 2 is disengaged is different according to the position of the roller retainer 69 in the direction of the axis line AX.

On the other hand, when the pressure plate 77 and the roller retainer 69 are arranged on the same side with respect to the plate group 66, as in this embodiment, the position of the pushrod 43 when the centrifugal clutch 2 is disengaged is constant.

17. Operation of Centrifugal Clutch 2

Figure 8:
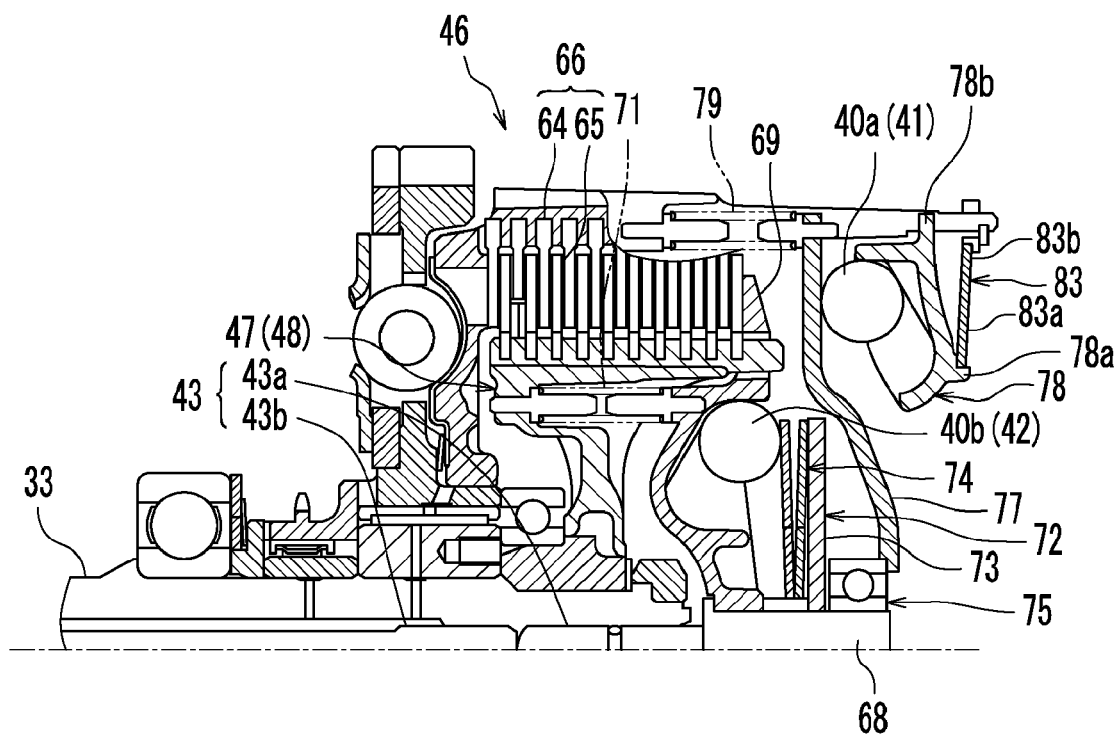
FIG. 8 is a sectional view of the clutch of FIG. 1 while being engaged with a main shaft rotating at a relatively high speed.
Figure 9:
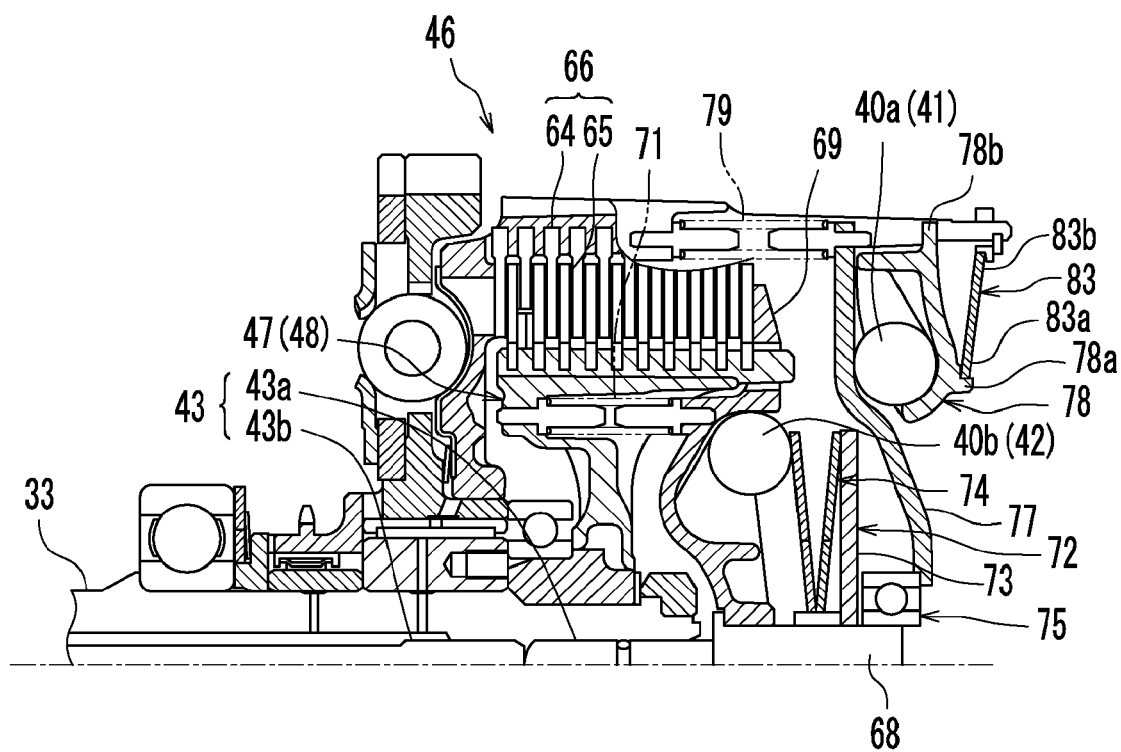
FIG. 9 is a cross-sectional view of the clutch of FIG. 1 at the moment the rotational speed of the main shaft is relatively high while the rotational speed of the crankshaft is relatively low.

Next, the operation of the centrifugal clutch 2 will be described with reference to FIGS. 1 and 8 to 10. FIGS. 8 to 10 show only a section of a portion of one side relative to the axis line AX of the centrifugal clutch 2 in view of the centrifugal clutch 2 being rotationally-symmetric with respect to the axis line AX.

18. Case where Centrifugal Clutch 2 is Connected

The upper side part of the centrifugal clutch 2 with respect to the axis line AX shown in FIG. 1 shows a state where the engine 4 is in an idling state and the centrifugal clutch 2 is not connected. On the other hand, the lower side part of the centrifugal clutch 2 with respect to the axis line AX shown in FIG. 1 shows an instantaneous state where the rotational speed of the crankshaft 32 is enhanced and the centrifugal clutch 2 is connected.

When the engine 4 is started and is in an idling state, the clutch housing 46 is rotated with the crankshaft 32. However, the rotational speed of the clutch housing 46 is relatively low. Thereby, the centrifugal force which acts on the input side roller weight 41 is relatively small. Therefore, the input side roller weight 41 is located relatively on the inside. Therefore, the pressure plate 77, the shaft 68 and the output side retainer 72 are located relatively to the right by the biasing force of the input side offspring 79. In the idling state, the main shaft 33 is not rotated or is rotated at a relatively low speed. Therefore, the centrifugal force which acts on the output side roller weight 42 is relatively small. Consequently, the output side roller weight 42 is located relatively on the inside. Therefore, the roller retainer 69 is located relatively to the right by the biasing force of the output side offspring 71. As a result, the distance between the roller retainer 69 and the bottom portion 46*a* of the clutch housing 46 is relatively wide, and the plate group 66 is in a non-pressed-contact state. Therefore, the rotation of the clutch housing 46 is not transmitted to the clutch boss 48.

When the rotational speed of the crankshaft 32 is relatively enhanced, the rotational speed of the clutch housing 46 also becomes relatively higher at the same time. The centrifugal force which acts on the input side roller weight 41 is also enlarged as the rotational speed of the clutch housing 46 is enhanced. As a result, the input side roller weight 41 is moved outwardly. Therefore, the pressure plate 77 is pressed to the left by the input side roller weight 41. Thereby, the pressure plate 77, the shaft 68 and the output side retainer 72 resist the biasing force of the input side offspring 79, and are moved to the left. As a result, the roller retainer 69 also resists the biasing force of the output side offspring 71 via the output side roller weight 42, and is moved to the left. That is, the roller retainer 69 is also moved to the side of the plate group 66. Thereby, the plate group 66 transitions into the pressed-contact state, and the centrifugal clutch 2 is connected. The state at that time is represented in the lower side part with respect to the axis line AX in FIG. 1.

When the centrifugal clutch 2 is connected, the rotation of the clutch housing 46 is transmitted to the clutch boss 48 via the plate group 66. Thereby, the clutch boss 48 is rotated with the clutch housing 46. When the rotation of the clutch boss 48 is started, the output side roller weight 42 is revolved at the same time. Therefore, the centrifugal force which acts on the output side roller weight 42 is increased. As a result, the output side roller weight 42 is moved outwardly in the centrifugal direction. FIG. 8 represents that state.

As shown in the lower side part with respect to the axis line AX in FIG. 1, the centrifugal clutch 2 is constituted so that the centrifugal clutch 2 is connected when only the input side roller weight 41 is moved outwardly in the centrifugal direction. That is, when only the input side roller weight 41 is moved outwardly in the centrifugal direction, the centrifugal clutch 2 is constituted so that the plate group 66 transitions into the pressed-contact state. Therefore, the roller retainer 69 cannot be substantially displaced to the left any more from the state where only the input side roller weight 41 is moved outwardly in the centrifugal direction. Because the roller retainer 69 cannot be substantially displaced nearer the plate group 66 even if the output side roller weight 42 is further moved outwardly in the centrifugal direction from the state, as shown in FIG. 8, the spring 74 and the disc spring 83 are transformed. Therefore, in the centrifugal clutch 2 according to this embodiment, the capacity of the centrifugal clutch 2 is determined by the elastic force of the disc spring 83.

19. Case where Centrifugal Clutch 2 is Disengaged

Next, the case where the centrifugal clutch 2 is disengaged will be described. When the rotational speed of the crankshaft 32 becomes lower in a state where the centrifugal clutch 2 shown in FIG. 8 is connected, the centrifugal force which acts on the input side roller weight 41 and the output side roller weight 42 is reduced. Herein, in this embodiment, as described above, the rotational speed of the clutch boss 48 that starts the movement of the output side roller weight 42 in the centrifugal direction is set to be lower than that of the input side roller weight 41. That is, first, the input side roller weight 41 is moved inwardly in the centrifugal direction if the rotational speed is reduced when the clutch housing 46 and the clutch boss 48 are integrally rotated. However, the output side roller weight 42 is not moved inwardly in the centrifugal direction immediately. Thereby, even if the rotational speed of the crankshaft 32 is reduced, the centrifugal clutch 2 is not necessarily disengaged immediately. Since the centrifugal clutch 2 is connected, engine braking is exerted. Thereby, the rotation of the main shaft 33 gradually becomes lower. At the same time, the centrifugal force which acts on the output side roller weight 42 is gradually reduced. When the rotational speed of the main shaft 33 becomes equal to or less than a prescribed rotational speed, the output side roller weight 42 is also moved inwardly in the centrifugal direction. As a result, the roller retainer 69 is moved to the right, and the centrifugal clutch 2 is disengaged.

Thus, in the centrifugal clutch 2 according to this embodiment, even if the rotational speed of the crankshaft 32 is reduced, the connected state of the centrifugal clutch 2 is maintained when the rotational speed of the main shaft 33 is relatively high. Even if the rotational speed of the clutch housing 46 is reduced to the rotational speed at which the input side roller weight 41 is moved inwardly in the centrifugal direction, the centrifugal clutch 2 remains in a connected state until the rotational speeds of the clutch housing 46 and clutch boss 48 are reduced to the rotational speed at which the output side roller weight 42 is moved inwardly in the centrifugal direction.

Specifically, in this embodiment, the following relationship is satisfied:

$$r_1 > r_2 \quad (1)$$

wherein $r_1$ is the rotational speed at which the input side roller weight 41 is moved inwardly in the centrifugal direction, and $r_2$ is the rotational speed at which the output side roller weight 42 is moved inwardly in the centrifugal direction.

For example, if output side roller weight 42 were not provided and the pressure plate 77 directly pressed the plate group 66 the centrifugal clutch 2 would disengage when the rotational speed of the clutch housing 46 is reduced to $r_1$.

On the other hand, in this embodiment in which the output side roller weight 42 is provided, the centrifugal clutch 2 is not disengaged until the rotational speed of the clutch housing 46 is set to $r_2$ which is lower than $r_1$. That is, the connected state of the centrifugal clutch 2 is maintained until the rotational speed of the clutch housing 46 is relatively reduced. As a result, engine braking can be exerted even in the region of a relatively low engine rotation number.

For example, when the engine 4 is in an idling state and the rotational speed of the main shaft 33 becomes relatively high even though the rotational speed of the crankshaft 32 is relatively low, as shown in FIG. 9, only the output side roller weight 42 is moved outwardly in the centrifugal direction. Thereby, the roller retainer 69 is pressed to the left and the plate group 66 is pressed and contacted. As a result, as shown in FIG. 9, the centrifugal clutch 2 is connected. When the centrifugal clutch 2 is connected, the clutch housing 46 is also rotated with the clutch boss 48. The rotation of the clutch housing 46 is transmitted to the crankshaft 32, and engine braking is exerted. Thereby, the rotational speeds of the centrifugal clutch 2 and main shaft 33 are reduced. When the rotational speeds of the main shaft 33 and centrifugal clutch 2 are below $r_2$, the centrifugal clutch 2 is disengaged.

Thus, in this embodiment, when the rotational speed of the main shaft 33 is relatively high even if the rotational speed of the crankshaft 32 is relatively reduced, the centrifugal clutch 2 is connected. As a result, engine braking can be exerted until the rotational speed of the main shaft 33 is lowered.

This operation is obtained even when the rotational speed at which the output side roller weight 42 is moved inwardly in the centrifugal direction is higher than that of the input side roller weight 41.

20. Operation and Effect

As described above, in this embodiment, the disc spring 83, which is a kind of plate spring, is used as a means for biasing the roller retainer 78. In addition, the outer side end portion 83*b* of the disc spring 83 is fixed to the clutch housing 46. Thereby, it is not necessary to separately provide a receiving member for receiving the biasing force of the disc spring 83 on the side of the outer side end portion 83*b* unlike the clutch described in the Seiji Publication. It is sufficient to provide only a fixing member for fixing the disc spring 83 to the clutch housing 46. Specifically, it is sufficient to provide only the spring stopper 84 and the circlip 85.

For example, when the compression coil spring is used and a relatively thick end plate is provided as a fixing member as in the clutch described in the Seiji Publication, a portion of the end plate receiving the reaction force of the compression coil spring and a portion of the end plate fixed to the clutch housing 46 are relatively separated. Thereby, the rigidity required for the end plate is relatively enhanced. In other words, a part between the portion of the end plate receiving the reaction force of the compression coil spring and the portion of the end plate fixed to the clutch housing 46 may be transformed when the rigidity of the end plate is low. Therefore, it is necessary to use a relatively thick and heavy end plate.

On the other hand, when the outer side end portion 83*b* of the disc spring 83 is directly fixed to the clutch housing 46 by the spring stopper 84 and the circlip 85, the part receiving the reaction force of the disc spring 83 and the part fixed to the clutch housing 46 are substantially the same. Thereby, the rigidity required for the spring stopper 84 and the circlip 85 is lower than the case described in the Seiji Publication. Therefore, the centrifugal clutch 2 can be compactified and the weight thereof can be reduced.

Thus, the rigidity of a member receiving the reaction force of the disc spring 83 on the side of one end portion of the disc spring 83 can be relatively reduced by arranging the one end portion thereof so that the one end portion is substantially in contact with the clutch housing 46. As a result, the centrifugal clutch 2 can be compactified and the weight thereof can be reduced.

For example, it may be possible to locate the inner side end portion 83*a* of the disc spring 83 relatively on the right in the vehicle-width direction and to locate the outer side end portion 83*b* relatively on the left in the vehicle-width direction. In other words, the disc spring 83 may be arranged so as to extend to the left in the vehicle-width direction toward the outer side end portion 83*b* from the inner side end portion 83*a*. However, in that case, it is necessary to fix the outer side end portion 83*b* to the clutch housing 46. Thereby, it is necessary to provide separately a fixing member for fixing the outer side end portion 83*b* to the clutch housing 46. Thus, when the fixing member is separately provided, a part receiving the biasing force from the disc spring 83 of the separately provided fixing member and an attached part to the clutch housing 46 are relatively separated. Therefore, relatively high rigidity is required for the fixing member that is separately provided. Therefore, it is necessary to use a relatively thick fixing member having relatively high rigidity.

On the other hand, in this embodiment, the disc spring 83 is arranged so as to extend to the left in the vehicle-width direction toward the inner side end portion 83*a* from the outer side end portion 83*b*. Thereby, the outer end portion 83*b* near the clutch housing 46 serves as an attached part to the clutch housing 46. Therefore, the disc spring 83 can be fixed to the clutch housing 46 by the spring stopper 84 and circlip 85 which require only relatively low rigidity. As a result, the centrifugal clutch 2 can be compactified and the weight thereof can be reduced.

By the way, it is also considered that the direction in which the pressure plate 77 presses the plate group 66 can be set opposite to the direction in which the roller retainer 69 presses the plate group 66. That is, it is also considered that the pressure plate 77 is arranged on one side of the plate group 66 while the roller retainer 69 is arranged on the other side of the plate group 66. However, in that case, there arises a problem that variation occurs in clutch release point in disengaging the centrifugal clutch 2 using the clutch release mechanism 86. That is, there arises a problem that variations in the position of the pushrod 43 occur when the centrifugal clutch 2 is disengaged. This originates in both the position of the right side end of the plate group 66 in the vehicle-width direction and the position of left side end of the plate group 66 in the vehicle-width direction, the positions being unstable. This is more specifically described below. When the position of the left side end of the plate group 66 in the vehicle-width direction is changed, the position of the roller retainer 69 in the vehicle-width direction, when the pressed-contact state of the plate group 66 is released is also changed. As a result, the position of the pushrod 43 in the vehicle-width direction when the centrifugal clutch 2 is disengaged is changed. Therefore, the clutch release point is also changed.

On the other hand, in the centrifugal clutch 2 according to this embodiment, the pressure plate 77 and the roller retainer 69 are located on the same side with respect to the plate group 66. The pressure plate 77 and the roller retainer 69 press the plate group 66 in the same direction. Thereby, the position of the left side end of the plate group 66 in the vehicle-width direction is constant. Therefore, the pressed-contact state of the plate group 66 is released, and the position of the roller retainer 69 when the centrifugal clutch 2 is disengaged is also constant. As a result, the clutch release point is stabilized.

However, for example, as in the clutch described in the Seiji Publication, it is also considered to arrange a plurality of compression coil springs arranged in the circumferential direction in place of the disc spring 83. In that case, since the elastic forces of the plurality of compression coil springs are not necessarily completely equal relative to each other, the biasing force to the roller retainer 78 is varied in the circumferential direction. As a result, a suitable close state of the plate group 66 may not be obtained.

On the other hand, when the disc spring 83 is used as in this embodiment, the biasing force to the roller retainer 78 is substantially uniform in the circumferential direction. Therefore, a suitable close state of the plate group 66 is easily obtained. Thereby, the centrifugal clutch 2 having excellent detachability can be obtained.

When the disc spring 83 is used as in this embodiment, the size of the movable region of the roller retainer 78 is entirely determined by the length of the disc spring 83 in the diameter direction. The longer the disc spring 83 in the diameter direction, the larger the movable region of the roller retainer 78 is may be. On the other hand, the longer the disc spring 83 in the diameter direction, the higher the rigidity required for the disc spring 83 is required to be. That is, in order to secure the large movable region of the roller retainer 78, the disc spring 83 in the diameter direction must be lengthened. However, the rigidity required for the disc spring 83 is thus enhanced. Therefore, it is difficult to secure the rigidity of the disc spring 83. In other words, when the disc spring 83 is used, it is difficult to secure the large movable region of the roller retainer 78. That is, when the disc spring 83 is used, it is difficult to secure the large movable region of the pressure member.

On the other hand, in this embodiment, the disc spring 83 is in a so-called inversely curved state such that the disc spring 83 is transformed until it extends in the opposite direction to the extending direction in a state where the stress of the disc spring 83 is not applied when the pushrod 43 is located on the rightmost side in the vehicle-width direction. Thus, the movable region of the outer side end portion 83b of the disc spring 83 can be extended by using the disc spring 83 until it is in a so-called inversely curved state. As a result, the movable region of the roller retainer 78 can be extended.

As shown in FIG. 1, it is preferable that the disc spring 83 has a length in the diameter direction so that the inner side end portion 83a is separated from the axis line AX as compared with the end portion of the input side roller weight 41 nearer the axis line AX when the input side roller weight 41 is located closest to the axis line AX. Thereby, the rigidity required for the disc spring 83 can be further reduced.

B. Alternative Embodiment 1

Hereinafter, alternative embodiments will be described in detail with reference to FIGS. 11 to 18. In the description of the following alternative embodiments 1 to 4, components having substantially the same function are described using reference numerals common to those of the above-described embodiment and the description thereof is omitted.

The above-described embodiment 1 concerns an exemplary construction in which the output side retainer 72 uses spring 74. However, the present invention is not limited to this construction. For example, as shown in FIG. 11, a plate 101 having no biasing member may be arranged in place of the output side retainer 72 having the spring 74.

Figure 11:
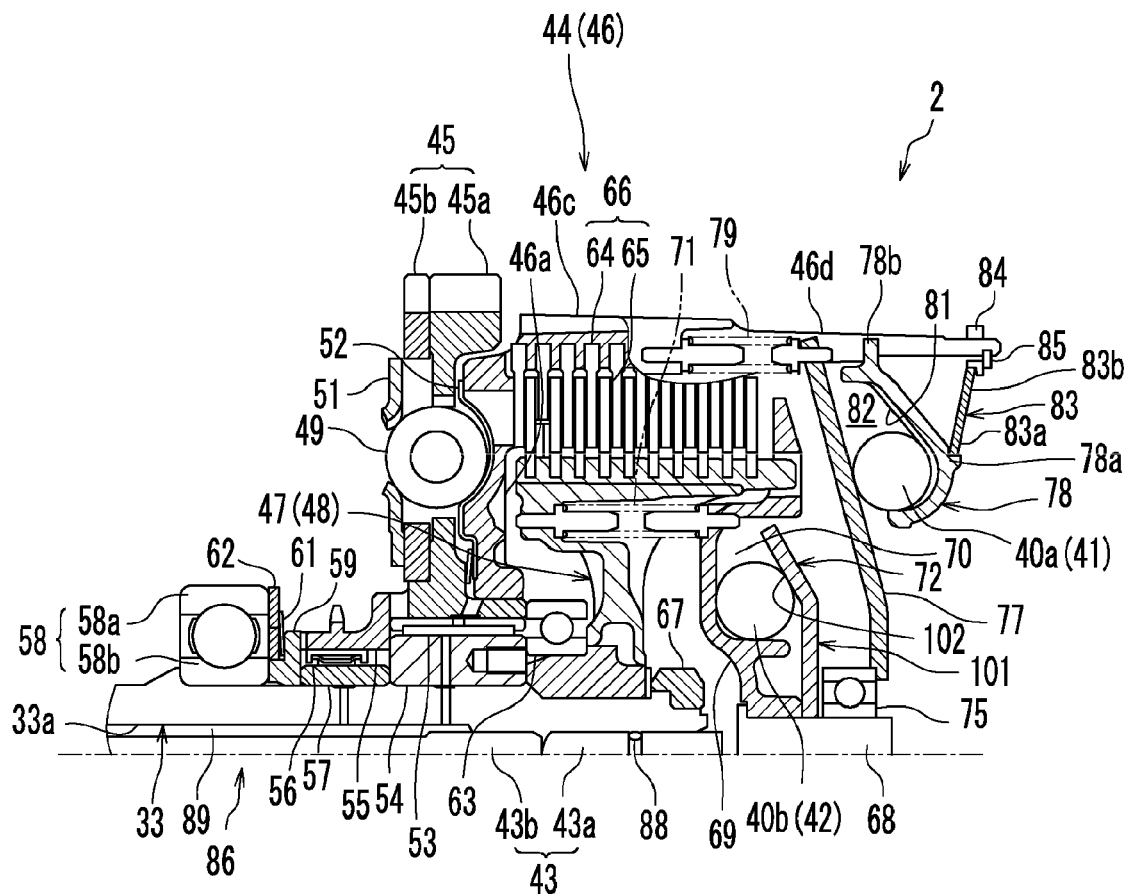
FIG. 11 is a cross-sectional view of a centrifugal clutch according to an alternative embodiment 1.

In the example shown in FIG. 11, the outer side part in the radial direction of the output side retainer 72 is formed so as to extend to the left in proportion to the increase in distance in the radial direction from the axis line AX. Thereby, a cam surface 102 extending to the left in proportion to the increase in distance in the radial direction from the axis line AX is formed. As a result, the space 70, having a narrower width in the direction of the axis line AX in proportion to the increase in distance in the radial direction from the axis line AX, is formed.

C. Alternative Embodiment 2

Figure 12:
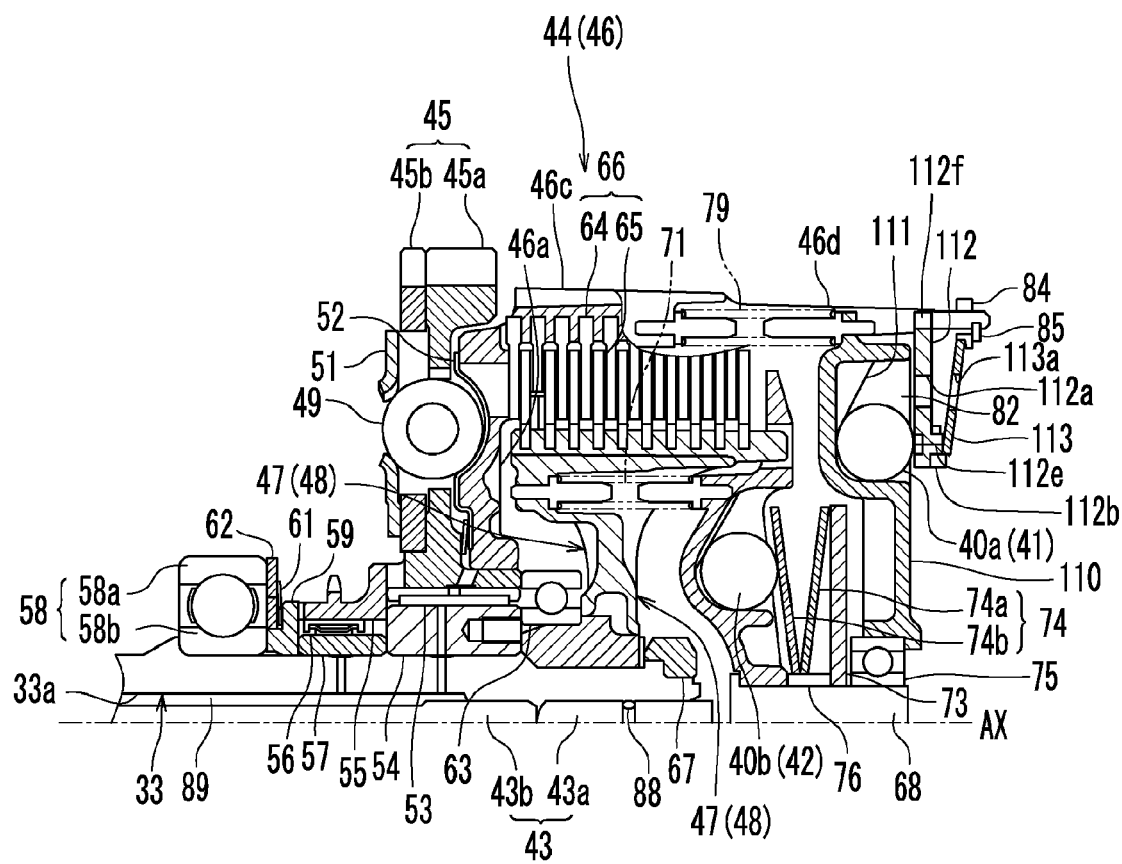
FIG. 12 is a cross-sectional view of a centrifugal clutch according to an alternative embodiment 2.

FIG. 12 is a cross-sectional view of a clutch according to alternative embodiment 2. In this embodiment, a pressure member 110 is arranged in place of the pressure plate 77. The central portion of the pressure member 110 is fixed to the outer ring 75b of the bearing 75. Thereby, the pressure member 110 is rotatable with respect to the shaft 68 and the main shaft 33.

1. Pressure Member 110

Figure 15:
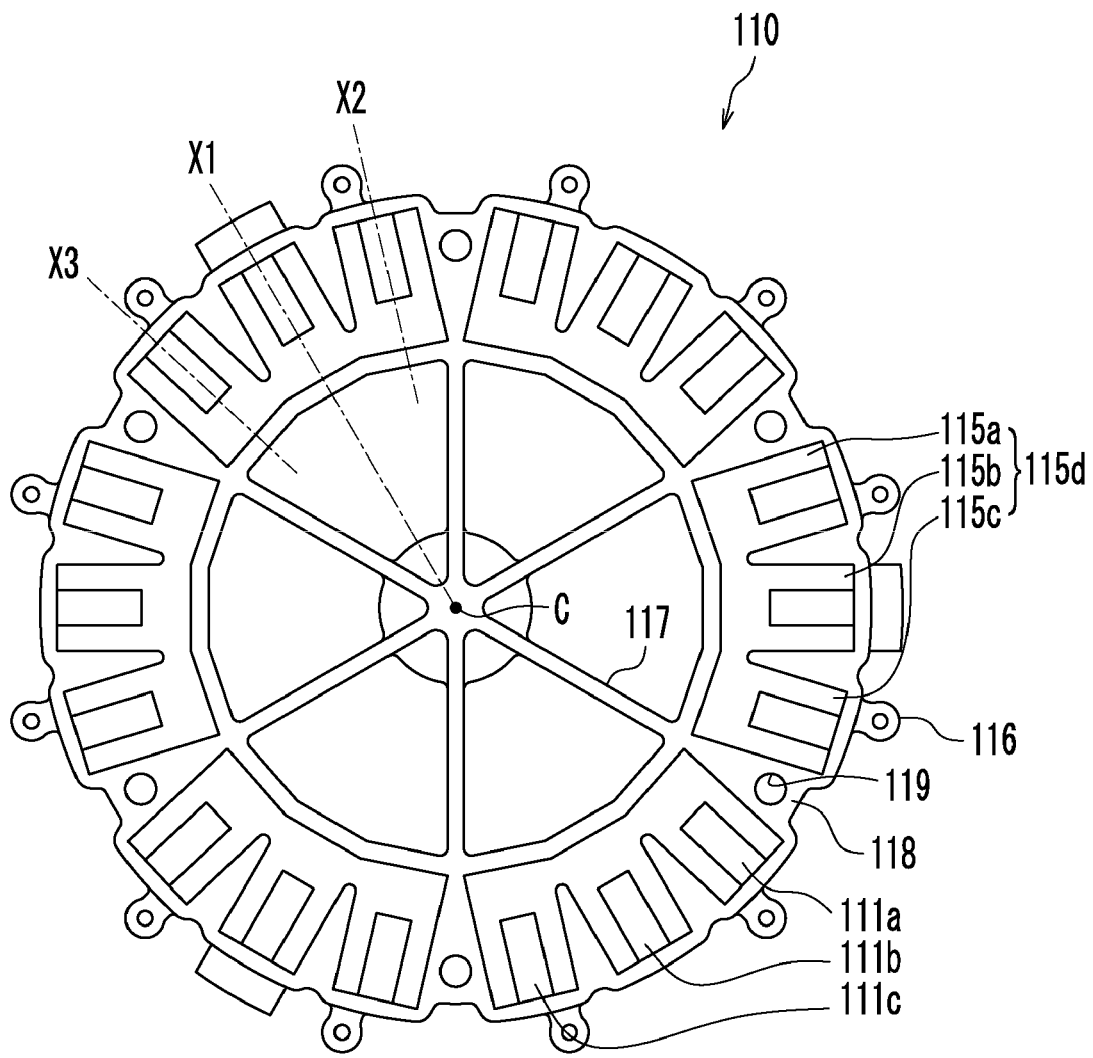
FIG. 15 is a plan view of a pressure member in accordance with alternative embodiment 2.

As shown in FIG. 15, a projection part 116 (projecting outwardly in the radial direction) is formed in the outer circumferential portion of the pressure member 110. This projection part 116 is engaged with the arm 46d of the clutch housing 46, and thereby the rotation of the pressure member 110 is stopped with respect to the clutch housing 46. Therefore, the pressure member 110 is rotated with the clutch housing 46.

A plurality of guide parts 115 are formed in the outer side portion of the pressure member 110 in the radial direction. A first guide part 115a, a second guide part 115b, and a third guide part 115c are contained in the plurality of guide parts 115. The first guide part 115a, the second guide part 115b, and the third guide part 115c constitute a guide part pair 115d. In the alternative embodiment 2, a total of six guide part pairs 115d are arranged in the circumferential direction. That is, a total of eighteen guide parts 115 are formed.

A direction X1 in which the second guide part 115b extends and the radial direction are nearly identical. On the other hand, a direction X2 in which the first guide part 115a extends and a direction X3 in which the third guide part 115c extends are slightly different from the radial direction. Thus, the interval between the outer side portion of the first guide part 115a in the radial direction and the outer side portion of the second guide part 115b in the radial direction is relatively narrowly set by arranging the first to third guide parts 115a to 115c. The interval between the outer side portion of the third guide part 115c in the radial direction and the outer side portion of the second guide part 115b in the radial direction is relatively narrowly set. As a result, the width in the circumferential direction of the outer side portion of the guide part pair 115d in the radial direction is relatively narrow. Therefore, it is easy to secure a space for forming ribs 118 having a relatively wide width of the outside of the radial direction between the adjacent guide part pairs 115d. A screw hole 119, which is formed in the outer side part in the radial direction of the rib 118, is formed relatively wider.

Each of the ribs 118 is formed continuously with a rib 117 which is located relatively inside in the radial direction, and radially extends from a center C. Thereby, a plurality of ribs extending to the outer circumferential portion of the pressure member 110 from the center C are formed. Therefore, the rigidity of the pressure member 110 is enhanced. The screw hole 119 is formed in each of the ribs 118.

A cam surface 111 is formed in each of the guide parts 115. Specifically, the cam surface 111 extends in the direction in which the guide part 115 extends. The cam surface 111 extends to the outer side end portion from the middle portion of the guide part 115 in the radial direction. The cam surface 111 is in contact with the rotatable central portion of the input side roller weight 41. As best seen in FIG. 15, the cam surface 111 protrudes relative to the surface of the guide part 115.

2. Retainer 112

Figure 14:
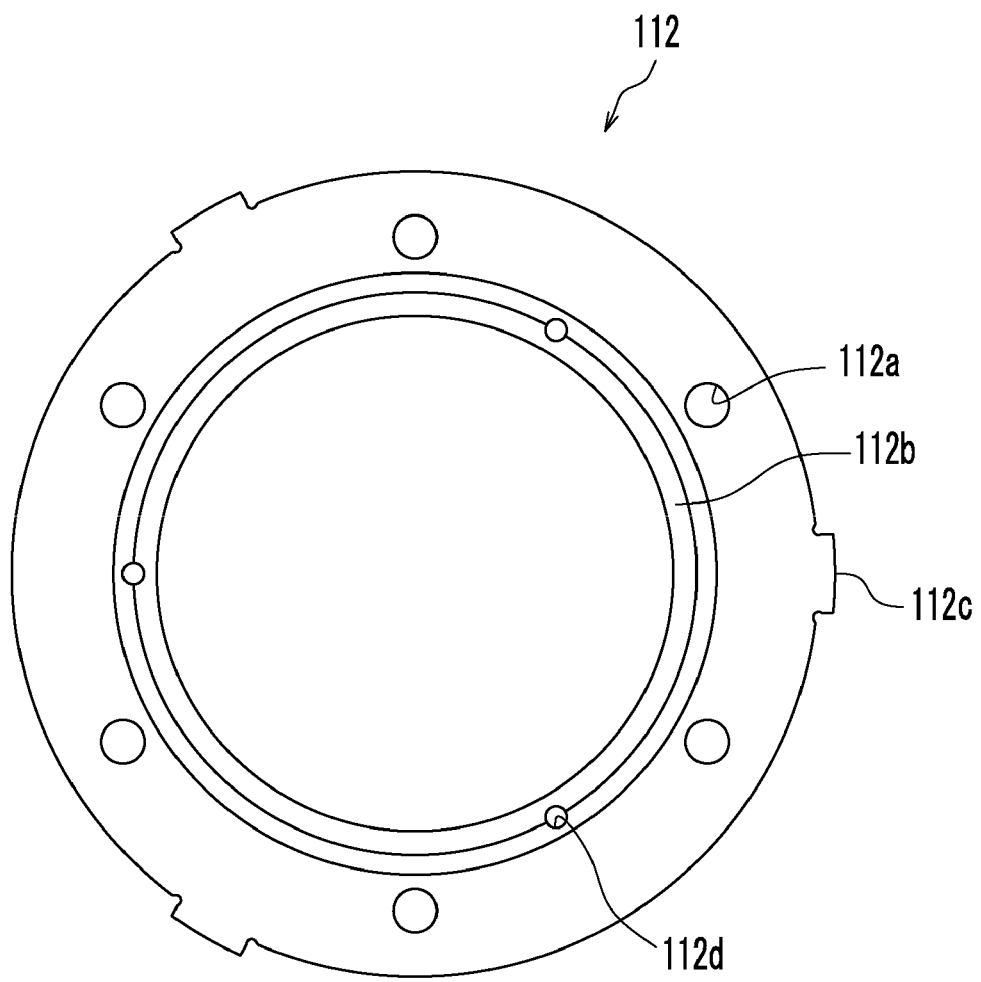
FIG. 14 is a plan view of a plate in accordance with alternative embodiment 2.

As shown in FIG. 12, in the alternative embodiment 2, the retainer 112 facing the pressure member 110 and having a ring shape in a plane view is arranged. As shown in FIG. 12, the retainer 112 has a flat plate shape in a side view. As shown in FIG. 14, a projection part 112c, which projects outwardly in the radial direction, is formed in the outer circumferential portion of the retainer 112. This projection part 112c is engaged with the arm 46d of the clutch housing 46 to stop the rotation of the retainer 112 with respect to the clutch housing 46. Therefore, the retainer 112 is rotated with the clutch housing 46. On the other hand, the retainer 112 can be displaced in the direction of the axis line AX.

As shown in FIGS. 12 and 14, a projection part 112b is formed in the inner side portion of the retainer 112 in the radial direction. A plurality of through-holes 112a arranged in the circumferential direction are formed in almost the center portion of the retainer 112 in the radial direction.

The inner side end portion 112e of the retainer 112 in the diameter direction is located on the right in the direction of the axis line AX relative to the outer side end portion 112f. Thereby, when the retainer 112 is located on the rightmost side in the direction of the axis line AX, a disc spring 113 is in a so-called inversely curved state.

3. Disc Spring 113

As shown in FIG. 12, even in the alternative embodiment 2, as in the above-described embodiment, the outer side end portion of the disc spring 113 in the radial direction is fixed to the clutch housing 46 in the direction of the axis line AX by the spring stopper 84 and the circlip 85.

Figure 13:
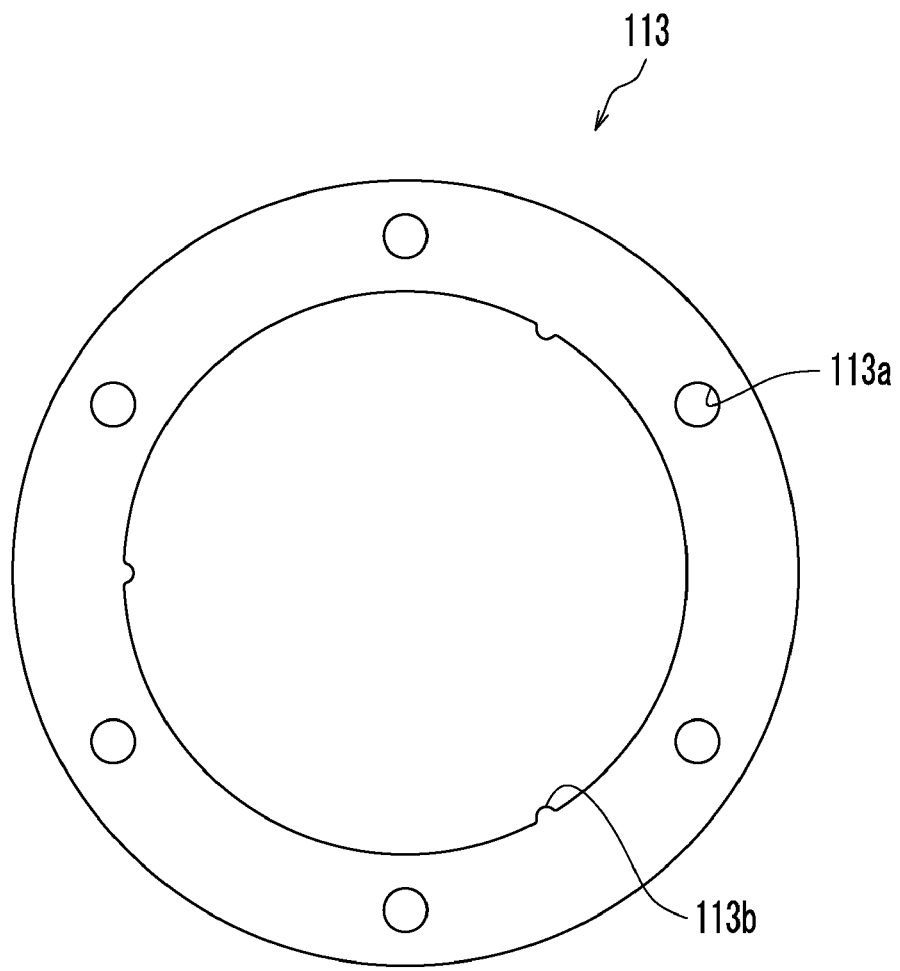
FIG. 13 is a plan view of a disc spring in accordance with alternative embodiment 2.

As shown in FIG. 13, a plurality of projection parts 113b projecting inwardly in the radial direction are formed in the inner side end portion of the disc spring 113 in the radial direction. This projection part 113b is engaged with a depressed part 112d of the retainer 112 shown in FIG. 14. Thereby, the disc spring 113 and the retainer 112 are fixed in the circumferential direction. A plurality of through-holes 113a arranged in the circumferential direction are formed in almost the center portion of the disc spring 113 in the radial direction.

4. Assembly of Pressure Member 110

When assembling the clutch according to the alternative embodiment 2, the pressure member 110, the input side roller weight 41, the retainer 112 and the disc spring 113 are integrated by passing a screw through the through-hole 113a of the disc spring 113 and the through-hole 112a of the retainer 112 and tightening the screw into the screw hole 119 of the pressure member 110. At the same time, the widths of the pressure member 110, the input side roller weight 41, the retainer 112 and disc spring 113 in the direction of the axis line AX are narrowed. In such a state, the integrated pressure member 110, input side roller weight 41, retainer 112 and disc spring 113 are incorporated into the clutch housing 46. Then, the spring stopper 84 and the circlip 85 are attached. Since the widths of the pressure member 110, input side roller weight 41, retainer 112 and disc spring 113 in the direction of the axis line AX are kept narrow in that case, the spring stopper 84 and the circlip 85 can be relatively easily attached. After the spring stopper 84 and the circlip 85 are attached, the screw tightened into the screw hole 119 can be removed, and the clutch according to the alternative embodiment 2 can be assembled.

D. Alternative Embodiment 3

Figure 16:
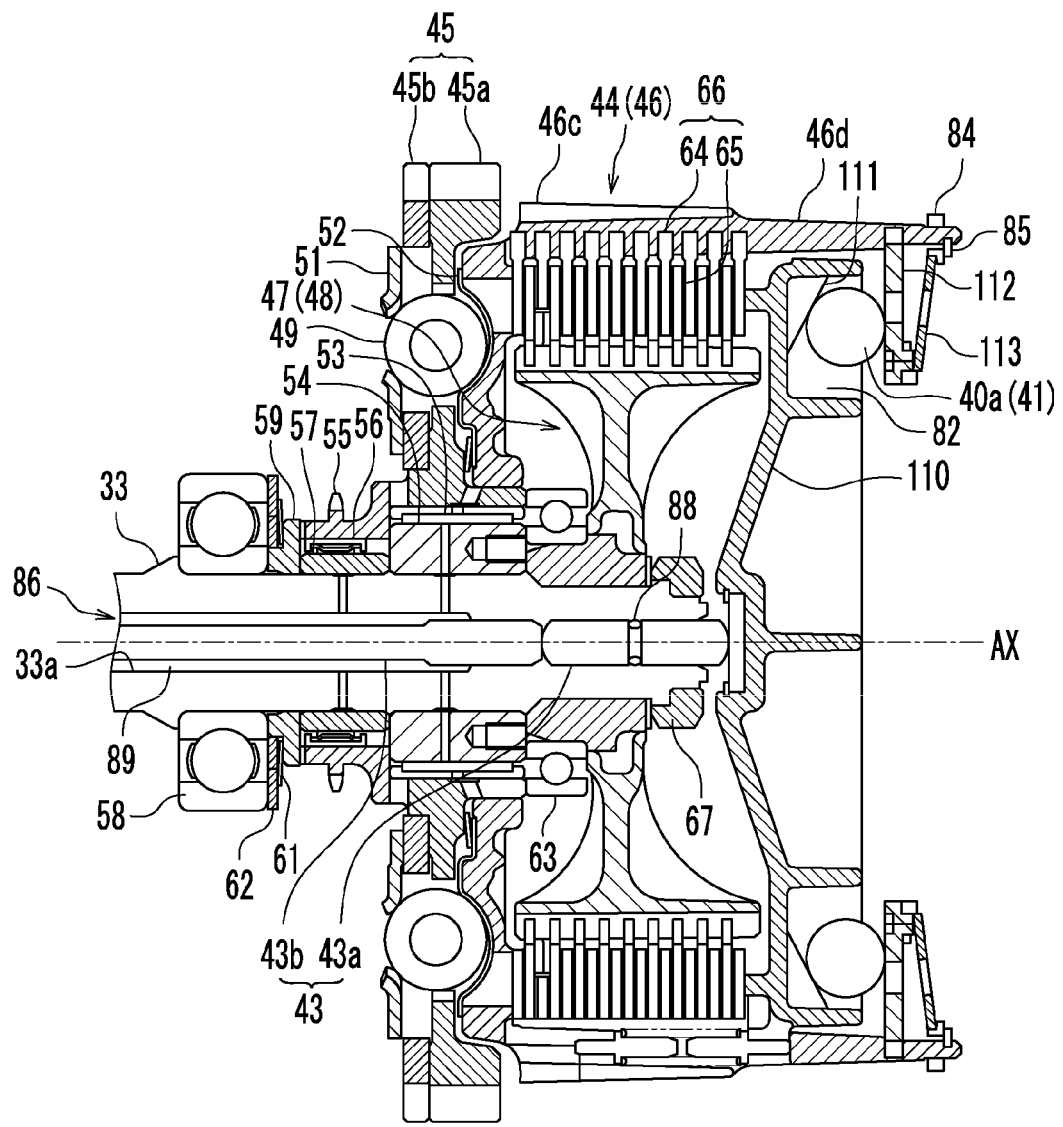
FIG. 16 is a cross-sectional view of a centrifugal clutch according to an alternative embodiment 3.

Alternative embodiment 3 is a modified version of the above-described alternative embodiment 2. Alternative embodiment 2 describes the example in which two kinds of roller weights 41 and 42 are provided. However, the present invention is not limited thereto. In other words, two kinds of roller weights 41 and 42 are not indispensable. For example, as shown in FIG. 16, only the input side roller weight 41 may be provided, and the pressure member 110 may press the plate group 66 directly.

E. Alternative Embodiment 4

Figure 17:
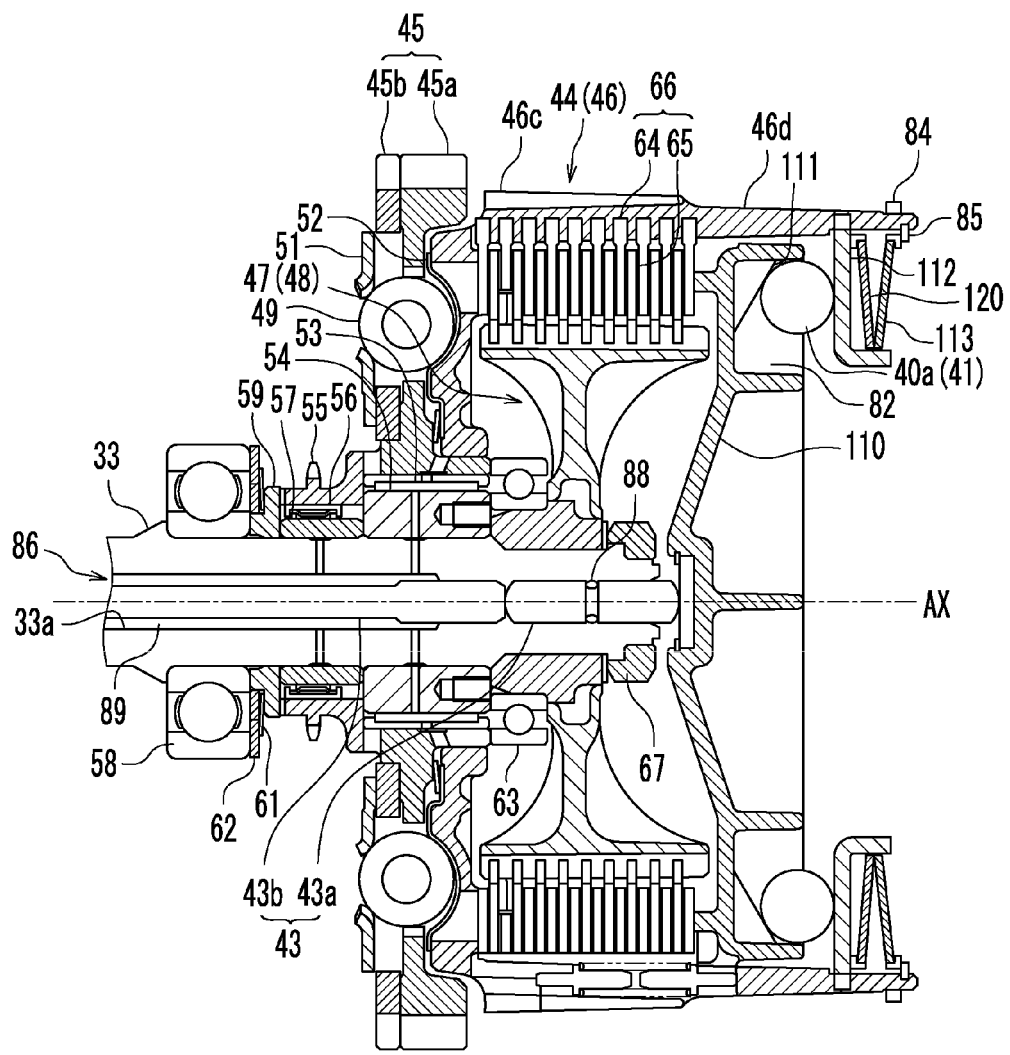
FIG. 17 is a cross-sectional view of a centrifugal clutch according to an alternative embodiment 4.

Alternative embodiment 4 is a modified version of alternative embodiment 3. Alternative embodiment 3 describes the example in which the pressure member 110 is biased by a single disc spring 113. However, the present invention is not limited thereto. As shown in FIG. 17, a plurality of disc springs may be serially arranged between the clutch housing 46 and the retainer 112.

Specifically, there may be further provided a disc spring 120 having an inner side end portion being in contact with the inner side end portion of the disc spring 113 in the diameter direction and an outer side end portion directly fixed to the retainer 112. Thus, the movable region of the pressure member 110 can be further widened by serially arranging the plurality of disc springs between the clutch housing 46 and the retainer 112.

F. Alternative Embodiment 5

Figure 18:
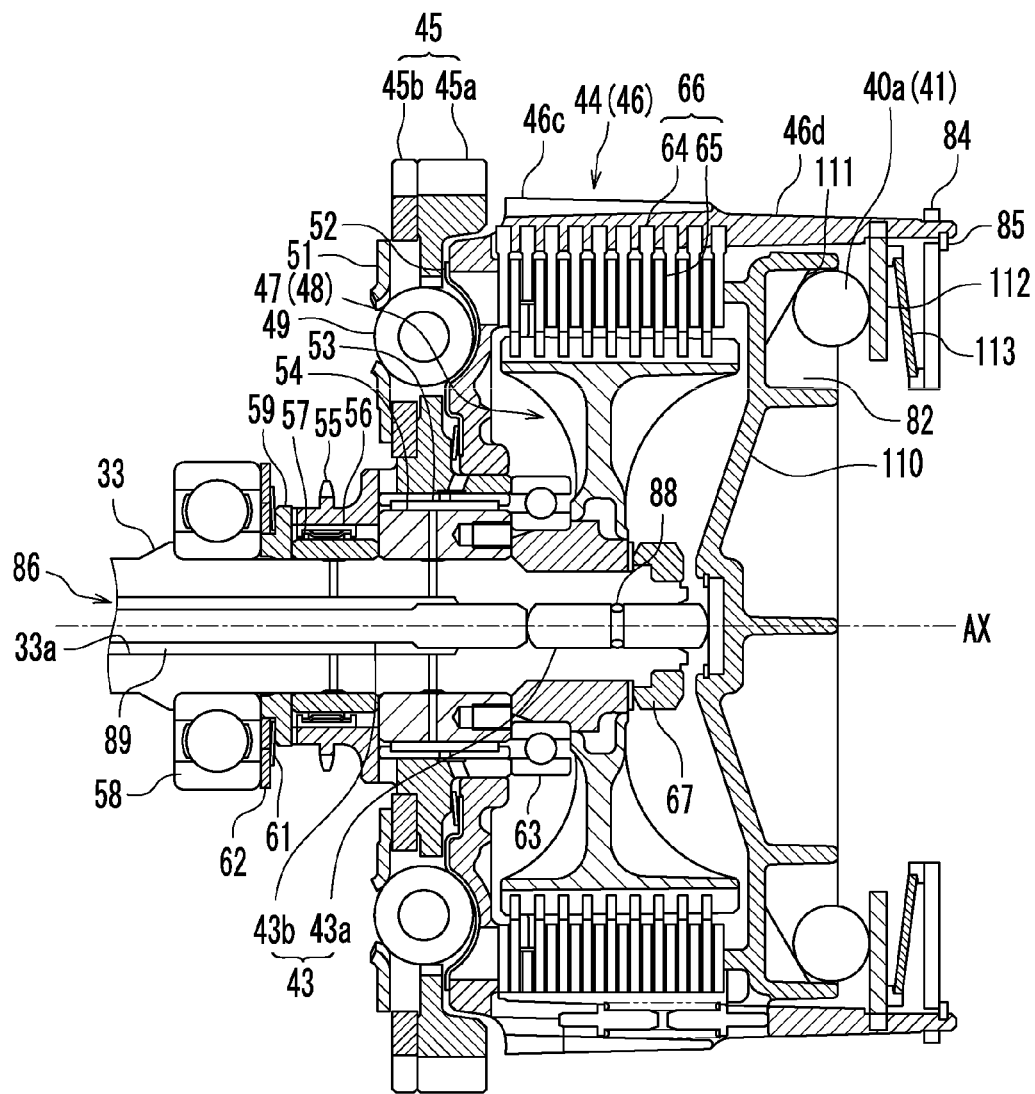
FIG. 18 is a cross-sectional view of a centrifugal clutch according to an alternative embodiment 5.
Figure 19:
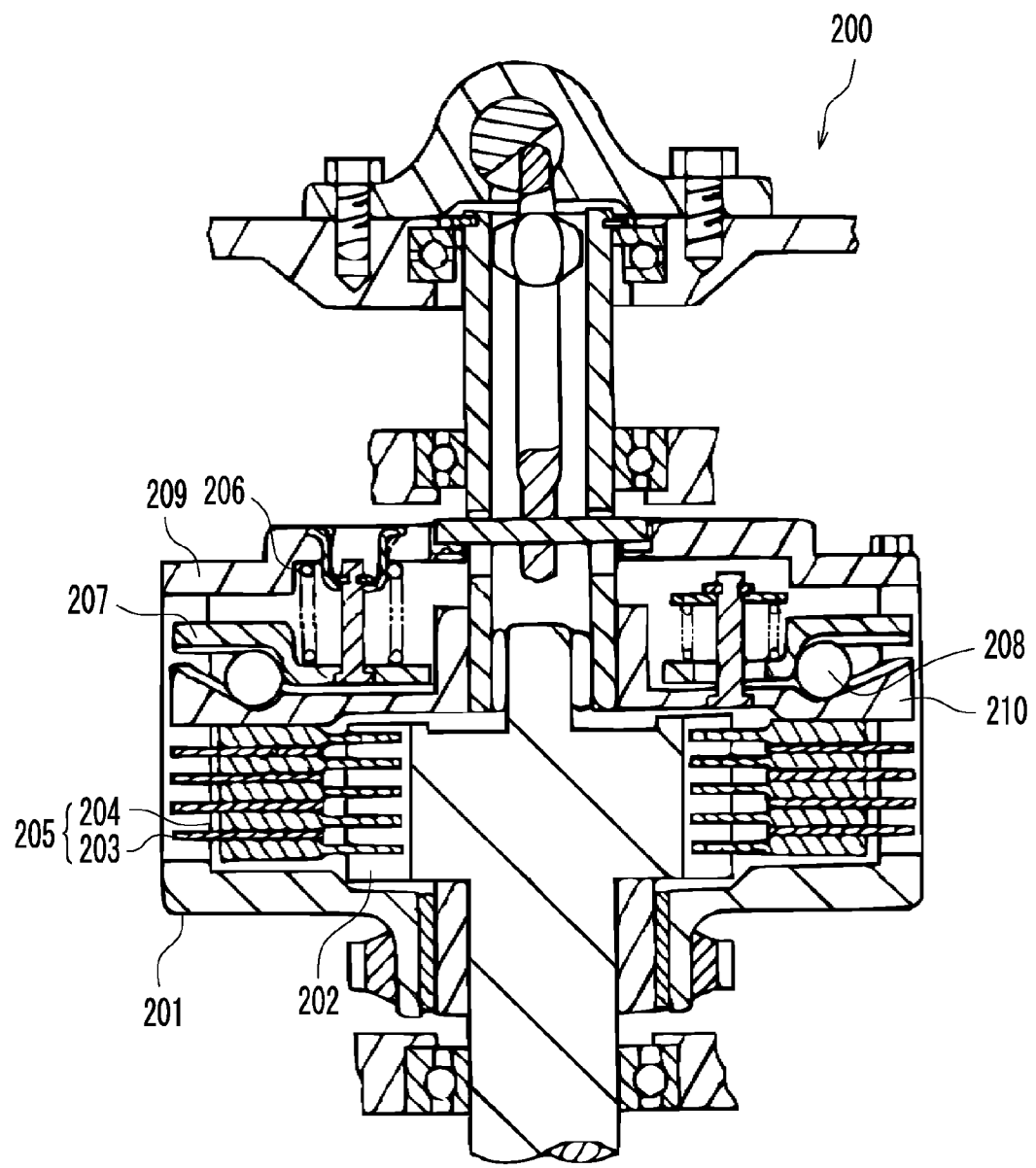
FIG. 19 is a cross-sectional view of a known centrifugal clutch, as described in Japanese Patent Publication No. 04-316724.

Alternative embodiment 5 is another modified version of alternative embodiment 3. Alternative embodiment 3 describes the example in which the outer side end portion of the disc spring 113 in the diameter direction is located on the right relative to the inner side end portion in the direction of the axis line AX. However, the present invention is not limited to this particular construction. As shown in FIG. 18, the disc spring 113 may be arranged so that the outer side end portion of disc spring 113 in the diameter direction is located on the left relative to the inner side end portion in the direction of the axis line AX. In order to fix the inner side end portion of the disc spring 113 to the clutch housing 46 in this case, the spring stopper 84 must extend relatively on the inside in the diameter direction. The spring stopper 84 must have relatively high rigidity. However, this allows for reduction of the rigidity of the retainer 112. As a result, the centrifugal clutch 2 can be compactified and the weight thereof can be reduced.

As described above, the one end portion of the disc spring can be located proximate to the clutch housing 46 by using the disc spring extending in a direction of being inclined to the axis line AX. As a result, the rigidity of the member being in contact with the one end portion of the disc spring relatively near the clutch housing 46 can be relatively reduced. As a result, the centrifugal clutch 2 can be compactified and the weight thereof can be reduced.

G. Other Alternative Embodiments

The above embodiments describe the motorcycle 1 which is the so-called narrowly-defined motorcycle shown in FIG. 1 as the example of a vehicle being used to carry out the present invention. However, the vehicle according to the present invention is not limited thereto. The vehicle according to the present invention may be a straddle-type vehicle such as an off-road type motorcycle, a scooter, a moped or an ATV (All-Terrain-Vehicle). The vehicle according to the present invention may also be a vehicle other than a straddle-type vehicle such as a four-wheel vehicle.

In the above embodiments, the preferred embodiments carrying out the present invention are described exemplifying the vehicle provided with the engine 4. However, the vehicle according to the present invention may not be provided with the engine. For example, the vehicle according to the present invention may be provided with any drive source. For example, the vehicle according to the present invention may be provided with an electric motor or the like as a drive source.

The above embodiments describe examples using the water cooled four-cycle parallel four-cylinder engine 4. However, the kind of the engine is not particularly limited in the present invention.

In the present invention, the drive force transmission mechanism which transmits the power from the power unit 3 to the rear wheel 19 is not limited to the chain 25. The drive force transmission mechanism may be, for example, a drive shaft and a belt or the like.

The above embodiment describes the example in which the clutch housing 46 constitutes the input side clutch member 44 and the clutch boss 48 constitutes the output side clutch member 47. However, the present invention is not limited to this constitution. For example, the clutch housing 46 may constitute the output side clutch member 47 and the clutch boss 48 may constitute the input side clutch member 44.

The rider of the motorcycle 1 operates the clutch lever or clutch pedal which is not shown, and thereby the driving mechanism such as the oil pump may be operated. The power generated by the oil pump may be applied to the clutch release mechanism 86 to forcibly release the pressed-contact state of the plate group 66.

While multiple embodiments have been described in connection with the figures hereinabove, the invention is not limited to these embodiments, but rather can be modified and adapted as appropriate. Thus, it is to be clearly understood that the above description was made only for purposes of an example and not as a limitation on the scope of the invention as claimed herein below.

What is claimed:

1. A centrifugal clutch, comprising:
    a clutch housing rotatable around an axis line, the clutch housing including a closed end and an open end;
    a clutch boss arranged inside the clutch housing and rotatable around the axis line;
    a plate group including a plurality of friction plates rotated with the clutch housing and a plurality of clutch plates facing the plurality of friction plates and rotated with the clutch boss, the plurality of clutch plates being arranged on the clutch boss so as to be displaceable in the direction of the axis line toward the plurality of friction plates;
    a pressure member coaxially arranged on an outer side of the plate group that is closer to the open end of the clutch housing than to the closed end of the clutch housing, the pressure member being directly supported by the clutch housing and displaceable in the direction of the axis line while being rotated with the clutch housing, the pressure member being displaced toward the plate group in the direction of the axis line to directly or indirectly press the plate group toward the closed end of the clutch housing and put the plate group in a pressed-contact state;
    a retainer facing a surface on an outer side of the pressure member opposite to an inner side of the pressure member facing the plate group, the retainer directly supported by the clutch housing so as to be displaceable in the direction of the axis line while being rotated with the clutch housing, and the retainer forming a space with the pressure member that narrows with increased radial distance from the axis line;
    a plate spring provided at the open end of the clutch housing and extending between the clutch housing and the retainer on an outer side of the retainer opposite to an inner side of the retainer facing the pressure member, the plate spring extending in a direction which is inclined relative to the direction of the axis line from a first end portion toward a second end portion in a centrifugal direction, and the first end portion being fixed directly or indirectly to the clutch housing on the outer side of the plate group while the second end portion directly or indirectly biases the retainer toward the pressure member;
    a pressing body arranged in the space formed between the pressure member and the retainer, the pressing body being revolved around the axis line with the rotation of the clutch housing, and the pressing body being moved outwardly in the centrifugal direction while pressing the pressure member toward the plate group by centrifugal force generated by the rotation of the clutch housing; and
    a clutch release mechanism configured to press the pressure member axially away from the plate group and release the pressed-contact state of the plate group when actuated by an actuation member.

2. The centrifugal clutch according to claim 1, wherein the plate spring is a disc spring formed substantially into a ring-belt shape.

3. The centrifugal clutch according to claim 1 or 2, wherein the second end portion of the plate spring is arranged nearer to the axis line and the retainer than the first end portion.

4. The centrifugal clutch according to claim 1, wherein the first end portion of the plate spring is located farther than the second end portion from the plate group in the direction of the axis line, except that when the pressing body is located outwardly in the centrifugal direction to its maximum extent and the clutch release mechanism is actuated the plate spring is transformed until the second end portion of the plate spring is located farther than the first end portion from the plate group in the direction of the axis line.

5. The centrifugal clutch according to claim 1, wherein the second end portion of the plate spring is supported by the retainer, and a portion of the retainer supporting the second end portion of the plate spring is located further from the plate group than a portion of the retainer supported by the clutch housing.

6. The centrifugal clutch according to claim 1, wherein an end portion of the plate spring nearest the axis line is separated from the axis line more than at least a portion of the pressing body when the pressing body is located nearest to the axis line in the centrifugal direction.

7. The centrifugal clutch according to claim 1, further comprising another plate spring having a first end portion being directly or indirectly fixed to the retainer in the direction of the axis line, and a second end portion being directly or indirectly fixed to the second end portion of the plate spring.

8. The centrifugal clutch according to claim 1, wherein the first end portion of the plate spring is located farther than the second end portion from the plate group in the direction of the axis line, except that when the pressure member is displaced away from the plate group to its maximum extent the plate spring is transformed until the second end portion of the plate spring is located farther than the first end portion from the plate group in the direction of the axis line.

9. A vehicle comprising the centrifugal clutch according to claim 1.

10. A centrifugal clutch, comprising:
a clutch housing rotatable around an axis line, the clutch housing including a closed end and an open end;
a clutch boss arranged inside the clutch housing and rotatable around the axis line;
a plate group including a plurality of friction plates rotated with the clutch housing and a plurality of clutch plates facing the plurality of friction plates and rotated with the clutch boss, the plurality of clutch plates being arranged on the clutch boss so as to be displaceable in the direction of the axis line toward the plurality of friction plates;
a pressure member disposed on an outer side of the plate group that is closer to the open end of the clutch housing than to the closed end of the clutch housing and coaxial with the plate group, the pressure member being directly supported by the clutch housing and displaceable in the direction of the axis line while being rotated with the clutch housing, the pressure member being biased away from the plate group when the rotational speed of the clutch housing is less than a predetermined threshold, and the pressure member being displaced in the direction of the axis line to directly or indirectly press the plate group toward the closed end of the clutch housing and put the plate group in a pressed-contact state when the rotational speed of the clutch housing exceeds the predetermined threshold;
a retainer facing a surface on an outer side of the pressure member opposite to an inner side of the pressure member facing the plate group, the retainer directly supported by the clutch housing so as to be displaceable in the direction of the axis line while being rotated with the clutch housing, and the retainer forming a space with the pressure member that narrows with increased radial distance from the axis line;
a plate spring provided at the open end of the clutch housing and extending between the clutch housing and the retainer on an outer side of the retainer opposite to an inner side of the retainer facing the pressure member, the plate spring extending in a direction which is inclined relative to the direction of the axis line from a first end portion toward a second end portion in a centrifugal direction, and the first end portion being fixed directly or indirectly to the clutch housing on the outer side of the plate group while the second end portion directly or indirectly biases the retainer toward the pressure member;
a pressing body arranged in the space formed between the pressure member and the retainer, the pressing body being revolved around the axis line with the rotation of the clutch housing, and the pressing body being moved outwardly in the centrifugal direction while pressing the pressure member toward the plate group by a centrifugal force generated by the rotation of the clutch housing when the rotational speed of the clutch housing exceeds the predetermined threshold; and
a clutch release mechanism configured to press the pressure member axially away from the plate group and release the pressed-contact state of the plate group when actuated by an actuation member.

11. The centrifugal clutch according to claim 10, wherein the second end portion of the plate spring is supported by the retainer, and a portion of the retainer supporting the second end portion of the plate spring is located further from the plate group than a portion of the retainer supported by the clutch housing.

12. A vehicle comprising the centrifugal clutch according to claim 10.

13. The centrifugal clutch according to claim 1, wherein the first end portion of the plate spring is fixed to the clutch housing by a ring-shaped spring stopper and a ringshaped circlip.

14. The centrifugal clutch according to claim 13, wherein the first end portion of the plate spring is in contact with an inner portion of the spring stopper in a diameter direction.

15. The centrifugal clutch according to claim 13, wherein a plurality of openings are arranged in a circumferential direction formed in the spring stopper.

16. The centrifugal clutch according to claim 15, wherein the clutch housing includes a plurality of arms, the plurality of arms of the clutch housing are inserted into the plurality of openings of the spring stopper, and a radially outer portion of the spring stopper is in contact with an end surface formed on an arm of the plurality of arms of the clutch housing.

17. The centrifugal clutch according to claim 16, wherein a notched part is formed on the circlip, wherein the circlip is fitted into a linear groove formed in the arm.

18. The centrifugal clutch according to claim 10, wherein the first end portion of the plate spring is fixed to the clutch housing by a ring-shaped spring stopper and a ringshaped circlip.

19. The centrifugal clutch according to claim 18, wherein the first end portion of the plate spring is in contact with an inner portion of the spring stopper in a diameter direction.

20. The centrifugal clutch according to claim 18, wherein a plurality of openings are arranged in a circumferential direction formed in the spring stopper.

21. The centrifugal clutch according to claim 1, wherein the retainer is displaceable in the direction of the axis line away from the pressure member when the pressing body is moved outwardly in the centrifugal direction while pressing the pressure member toward the plate group by the centrifugal force.

\* \* \* \* \*